(12) United States Patent
Naiknaware et al.

(10) Patent No.: US 9,263,895 B2
(45) Date of Patent: Feb. 16, 2016

(54) DISTRIBUTED ENERGY CONVERSION SYSTEMS

(75) Inventors: Ravindranath Naiknaware, Portland, OR (US); Triet Tu Le, Portland, OR (US); Terri Shreeve Fiez, Corvallis, OR (US); Kartikeya Mayaram, Corvallis, OR (US)

(73) Assignee: SUNPOWER CORPORATION, San Jose, CA (US)

( * ) Notice: Subject to any disclaimer, the term of this patent is extended or adjusted under 35 U.S.C. 154(b) by 866 days.

(21) Appl. No.: 12/340,715

(22) Filed: Dec. 20, 2008

(65) Prior Publication Data
US 2009/0160259 A1    Jun. 25, 2009

Related U.S. Application Data

(60) Provisional application No. 61/008,670, filed on Dec. 21, 2007.

(51) Int. Cl.
*H02M 7/42* (2006.01)
*H02J 3/38* (2006.01)
*H02M 7/48* (2007.01)
*H02S 40/32* (2014.01)

(52) U.S. Cl.
CPC .............. *H02J 3/383* (2013.01); *H02J 3/385* (2013.01); *H02J 3/386* (2013.01); *H02M 7/4807* (2013.01); *H02S 40/32* (2014.12); *H02J 3/382* (2013.01); *H02J 3/387* (2013.01); *Y02E 10/563* (2013.01); *Y02E 10/58* (2013.01); *Y02E 10/763* (2013.01); *Y10T 307/707* (2015.04)

(58) Field of Classification Search
CPC .................................. H02J 3/383; H02J 3/385
USPC ....................................................... 307/77, 82
See application file for complete search history.

(56) References Cited

U.S. PATENT DOCUMENTS

| 4,217,633 A | 8/1980 | Evans, Jr. |
| 4,404,472 A | 9/1983 | Steigerwald |
| 5,274,274 A | 12/1993 | Leman et al. |
| 5,604,430 A | 2/1997 | Decker et al. |
| 5,623,398 A | 4/1997 | Beach et al. |

(Continued)

FOREIGN PATENT DOCUMENTS

| JP | 2000207040 A | * | 7/2000 |
| WO | WO 2006005125 A1 | * | 1/2006 |
| WO | WO 2007/080429 | | 7/2007 |

OTHER PUBLICATIONS

Ninth Edition, Modern Dictionary of Electronics by Rudolf F. Graf. Copyright 1999. ISBN 0-7506-9866-7. Newnes is an imprint of Butterworth-Heinemann.*

(Continued)

*Primary Examiner* — Fritz M Fleming
(74) *Attorney, Agent, or Firm* — Barnes & Thornburg LLP

(57) ABSTRACT

A distributed energy conversion system may include one or more DC power sources and two or more inverters to convert DC power from the power sources to AC power. The AC power from the two or more inverters may be combined to provide a single AC output. A module may include one or more photovoltaic cells and two or more inverters. An integrated circuit may include power electronics to convert DC input power to AC output power and processing circuitry to control the power electronics. The AC output power may be synchronized with an AC power distribution system.

17 Claims, 19 Drawing Sheets

(56) References Cited

U.S. PATENT DOCUMENTS

| | | | |
|---|---|---|---|
| 5,677,833 | A * | 10/1997 | Bingley .......................... 363/71 |
| 5,691,627 | A | 11/1997 | Shum |
| 5,801,519 | A | 9/1998 | Midya et al. |
| 5,870,266 | A | 2/1999 | Fogg |
| 5,914,542 | A | 6/1999 | Weimer et al. |
| 6,075,716 | A | 6/2000 | He et al. |
| 6,111,767 | A | 8/2000 | Handleman |
| 6,259,017 | B1 | 7/2001 | Takehara et al. |
| 6,262,558 | B1 | 7/2001 | Weinberg |
| 6,307,144 | B1 * | 10/2001 | Mimura et al. ............... 136/244 |
| 6,339,538 | B1 | 1/2002 | Handleman |
| 6,462,976 | B1 * | 10/2002 | Olejniczak et al. ........... 363/147 |
| 6,593,521 | B2 * | 7/2003 | Kobayashi .................... 136/244 |
| 6,611,441 | B2 | 8/2003 | Kurokami et al. |
| 6,614,133 | B2 | 9/2003 | Belson et al. |
| 6,690,590 | B2 | 2/2004 | Stamenic et al. |
| 6,713,890 | B2 * | 3/2004 | Kondo et al. ............... 290/40 B |
| 6,800,964 | B2 * | 10/2004 | Beck .............................. 307/126 |
| 6,838,611 | B2 * | 1/2005 | Kondo et al. ................. 136/244 |
| 6,849,842 | B2 | 2/2005 | Little |
| 7,031,176 | B2 | 4/2006 | Kotsopoulos et al. |
| 7,091,752 | B2 | 8/2006 | Balakrishnan |
| 7,158,389 | B2 | 1/2007 | Yasumura |
| 7,221,011 | B2 | 5/2007 | Banerjee et al. |
| 7,319,313 | B2 | 1/2008 | Dickerson et al. |
| 7,335,944 | B2 | 2/2008 | Banerjee et al. |
| 7,372,709 | B2 | 5/2008 | Mazumder et al. |
| 7,382,112 | B2 | 6/2008 | Krein |
| 7,391,088 | B2 | 6/2008 | Balakrishnan |
| 7,435,897 | B2 | 10/2008 | Russell |
| 2002/0179140 | A1 * | 12/2002 | Toyomura .................... 136/251 |
| 2003/0036806 | A1 | 2/2003 | Schienbein et al. |
| 2003/0198063 | A1 | 10/2003 | Smyth |
| 2004/0117676 | A1 * | 6/2004 | Kobayashi et al. ........... 713/300 |
| 2004/0223310 | A1 | 11/2004 | Toyomura |
| 2005/0110454 | A1 | 5/2005 | Tsai et al. |
| 2005/0275386 | A1 | 12/2005 | Jepsen et al. |
| 2006/0164065 | A1 | 7/2006 | Hoouk et al. |
| 2007/0000535 | A1 * | 1/2007 | Mesmer et al. ............... 136/252 |
| 2007/0133241 | A1 | 6/2007 | Mumtaz et al. |
| 2007/0159866 | A1 | 7/2007 | Siri |
| 2007/0221267 | A1 | 9/2007 | Fornage |
| 2007/0236187 | A1 | 10/2007 | Wai et al. |
| 2008/0055952 | A1 | 3/2008 | Chisenga et al. |
| 2008/0136367 | A1 | 6/2008 | Adest et al. |
| 2008/0143188 | A1 | 6/2008 | Adest et al. |
| 2008/0144294 | A1 | 6/2008 | Adest et al. |
| 2008/0147335 | A1 | 6/2008 | Adest et al. |
| 2008/0150366 | A1 | 6/2008 | Adest et al. |
| 2008/0164766 | A1 | 7/2008 | Adest et al. |
| 2008/0266922 | A1 | 10/2008 | Mumtaz et al. |
| 2010/0157632 | A1 * | 6/2010 | Batten et al. .................... 363/74 |
| 2010/0157638 | A1 * | 6/2010 | Naiknaware et al. ......... 363/131 |

OTHER PUBLICATIONS

Enslin, J.H.R., "Integrated Photovoltaic Maximum Power Point Tracking Converter", Dec. 1997, pp. 769-773, vol. 44 Issue 6, IEEE Transactions on Industrial Electronics.
Walker, G.R., "Cascaded DC-DC Converter Connection of Photovoltaic Modules", Jul. 2004, p. 1130-1139, vol. 19 Issue 4, IEEE Transactions on Power Electronics.
Brekken, T., "Utility-Connected Power Converter for Maximizing Power Transfer from a Photovoltaic Source While Drawing Ripple-Free Current", Power Electronics Specialists Conference, 2002, IEEE 33rd Annual, p. 1518-1522, vol. 3, IEEE.
Ahmed, N.A., "Time-Sharing Sinewave Absolute Value Tracking Boost Chopper Controlled One Stage Power Conditioner with Non Electrolytic Capacitor DC Filter Link", International Conference on Power Electronics and Drives Systems (PEDS), 2005, p. 185-191, vol. 1, IEEE PEDS.
Choi, J.W., "Resonant Link Bidirectional Power Converter Without Electrolytic Capacitor", 1993, 24th Annual IEEE Power Electronics Specialists Conference, 1993, PESC '93 Record, p. 293-299, IEEE.
De Oliveira Filho, M.E., "A Control Method for Voltage Source Inverter Without DC Link Capacitor", Jun. 2008, IEEE Power Electronics Specialists Conference, 2008. PESC 2008, p. 4432-4437, IEEE.
Sarén, H. "Verification of Frequency Converter with Small DC-Link Capacitor", 2005 European Conference on Power Electronics and Applications, p. 1-10.
Hirao, T., "A Modified Modulation Control of a Single-Phase Inverter with Enhanced Power Decoupling for a Photovoltaic AC Module", 2005 European Conference on Power Electronics and Applications, p. 1-10.
Khajehoddin, S.A., "A Robust Power Decoupler and Maximum Power Point Tracker Topology for a Grid-Connected Photovoltaic System", Jun. 2008, Power Electronics Specialists Conference (PESC 2008), p. 66-69, IEEE.
Rodriguez, C., "Energy Control for Long Lifetime Photovoltaic AC Module Inverter", Jun. 2006, 37th IEEE Power Electronics Specialists Conference, 2006 (PESC '06), p. 1-6, IEEE.
Rodriguez, C., "Long-Lifetime Power Inverter for Photovoltaic AC Modules", Jul. 2008, IEEE Transactions on Industrial Electronics, p. 2593-2601, vol. 55, Issue 7, IEEE.
Shinjo, F., "A Single-Phase Grid-Connected Inverter with a Power Decoupling Function", Power Electronics Specialists Conference, 2007. (PESC 2007) IEEE, p. 1245-1249, IEEE.
Shimizu, T., "A Flyback-type Single Phase Utility Interactive Inverter with Low-frequency Ripple Current Reduction on the DC Input for an AC Photovoltaic Module System", 2002, pp. 1483-1488, IEEE.
Li, Q., "Recent Development in the Topologies for Photovoltaic Module Integrated Converters", Jun. 2006, Power Electronics Specialists Conference, 2006 (PESC '06) 37th IEEE, pp. 1-8, IEEE.
Li, Q., "A Review of the Single Phase Photovoltaic Module Integrated Converter Topologies With Three Different DC Link Configurations", May 2008, IEEE Transactions on Power Electronics, pp. 1320-1333, vol. 23, No. 3, IEEE.
Kjaer, S.B., "A Review of Single-Phase Grid-Connected Inverters for Photovoltaic Modules", Oct. 2005, IEEE Transactions on Industry Applications, pp. 1292-2005, vol. 41, No. 5, IEEE.
Wills, "The AC Photovoltaic Module", May 1996, 25th PVSC, pp. 1231-1234, IEEE.
Amaratunga, Gehan, "Grid Connected Solar Power in Cities", Oct. 16, 2007, Power Point presentation, pp. 1-27, University of Cambridge.
U.S. Appl. No. 12/368,987, filed Feb. 10, 2009, not yet published.
U.S. Appl. No. 12/368,990, filed Feb. 10, 2009, not yet published.
International Search Report dated Feb. 12, 2009, from related PCT application No. PCT/US2008/87882, filed Dec. 21, 2008.
Written Opinion of the International Searching Authority from International Search Report dated Feb. 12, 2009, from related PCT application No. PCT/US2008/87882, filed Dec. 21, 2008.
International Preliminary Report on Patentability dated Jun. 22, 2010 for PCT application No. PCT/US2008/087882 filed Dec. 21, 2008.
International Search Report and Written Opinion dated Aug. 3, 2010, from PCT Application No. PCT/US2009/068871, filed Dec. 18, 2009, 9 pages.
National Electrical Code 2005 Edition, p. 70-546.
C. Rodriguez and G. Amaratunga, "Dynamic stability of grid-connected photovoltaic systems," in Proc. IEEE Power Eng. Soc. Gen. Meeting, Jun. 2004, pp. 2194-2200.

* cited by examiner

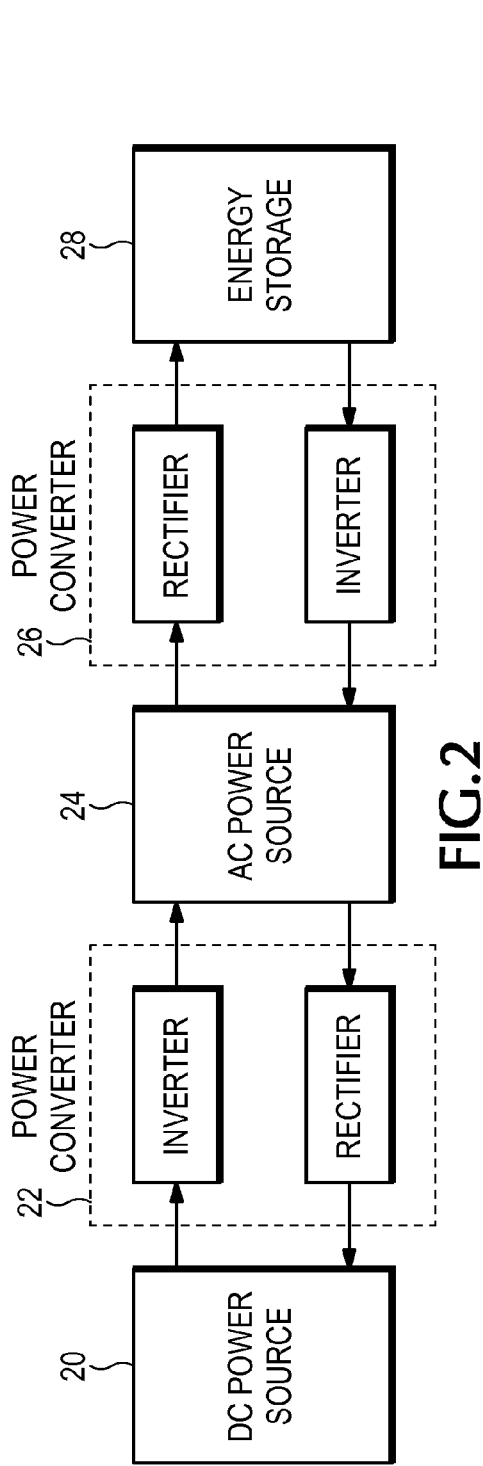
FIG.2
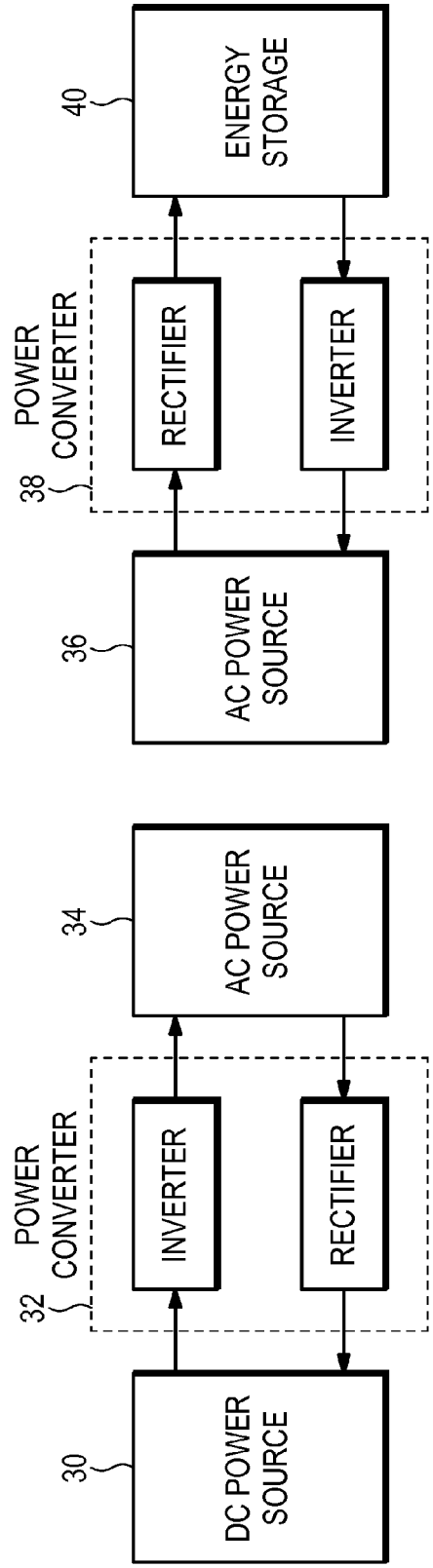
FIG.4
FIG.3

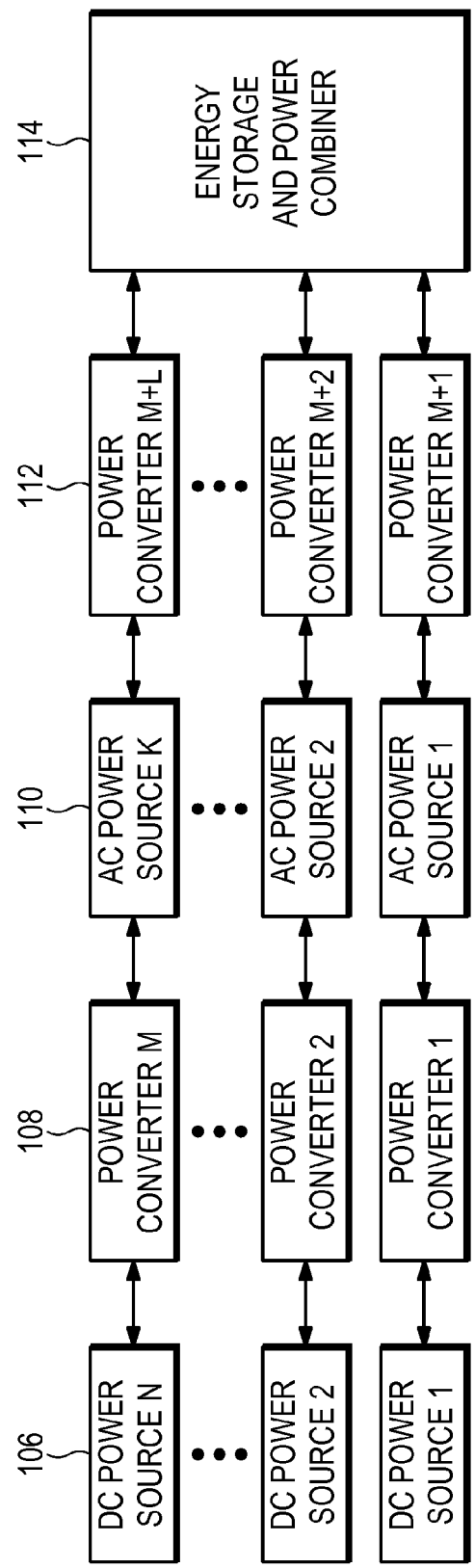
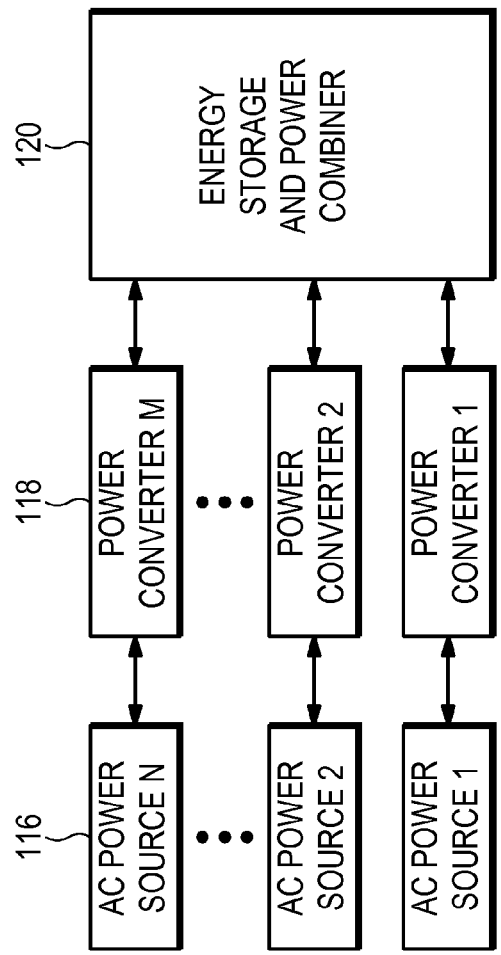
FIG.15
FIG.16

DISTRIBUTED ENERGY CONVERSION SYSTEMS

CROSS-REFERENCE TO RELATED APPLICATIONS

This application claims priority from U.S. Provisional Patent Application Ser. No. 61/008,670 filed Dec. 21, 2007 and titled "Distributed Energy Conversion Systems" which is incorporated by reference.

BACKGROUND

Power converters are used to convert electric power from one form to another, for example, to convert direct current (DC) to alternating current (AC) and vice versa. Power converters play an important role in the development of alternative energy sources which often provide power in a form that is not ideal for use or distribution. For example, photovoltaic (PV) panels installed on the roof of a building may provide power in the form of DC current at relatively low voltages. This power must be converted to AC current at higher voltages for use with lighting or appliances within the building, or for distribution to other users through the power grid. As another example, a plug-in hybrid vehicle may need to convert AC power from the grid to DC power for storage in a battery. The DC power from the battery may then need to be converted back to AC power to operate the vehicle drive train, or to feed power back to the grid if the vehicle is also used as an off-peak energy storage device. Even within energy systems based on conventional sources, power converters are becoming more important to implement advanced energy management, storage and conservation techniques.

FIG. 24 illustrates a prior art photovoltaic (PV) energy system for delivering solar energy to a utility grid. The PV array is voltage and current sensed to acquire maximum power point tracking at the panel or module level. In a solar energy/power conversion system, the inverter is a critical component which controls the flow of electricity between the PV module and the load, for example, a battery or the grid. Conventional inverters operate at higher power levels, typically from one to several hundred kilowatts peak (kWp). At these high power levels, inverters typically require heat sinks and fans or liquid cooling to accommodate higher heat dissipation. The addition of the fan and/or liquid cooling reduces the reliability of the system.

BRIEF DESCRIPTION OF THE DRAWINGS

FIG. 2 illustrates another embodiment of an energy converter system according to the inventive principles of this patent disclosure.

FIG. 3 illustrates another embodiment of an energy converter system according to the inventive principles of this patent disclosure.

FIG. 4 illustrates another embodiment of an energy converter system according to the inventive principles of this patent disclosure.

FIG. 15 illustrates an embodiment of a power converter stack-up with an energy storage device according to the inventive principles of this patent disclosure.

FIG. 16 illustrates another embodiment of a power converter stack-up with an energy storage device according to the inventive principles of this patent disclosure.

DETAILED DESCRIPTION

This patent disclosure encompasses numerous inventive principles relating to energy conversion systems. Such systems include distributed power converters including power inverters and/or power rectifiers. Such inverter systems may be used in various applications including but not limited to solar energy systems, wind power energy systems, thermal energy systems, various battery systems, fuel cell energy systems, uninterruptible power supplies, hydroelectric energy systems, data center systems, communication infrastructure power supplies, electric and hybrid vehicles, household power, motor, satellite, aerospace, consumer applications, etc.

Figure 1:
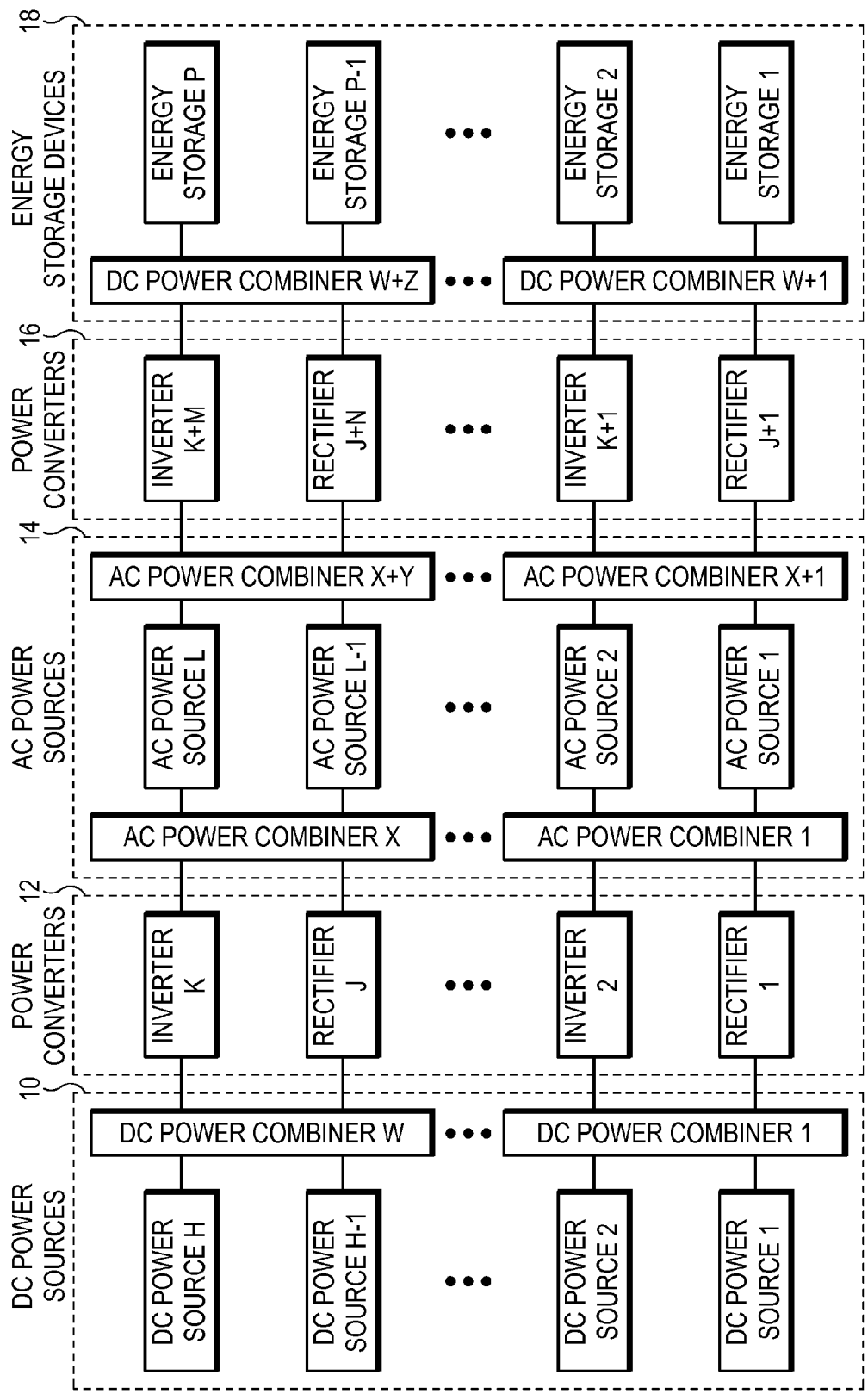
FIG. 1 illustrates an embodiment of an energy converter system according to the inventive principles of this patent disclosure.

FIG. 1 illustrates an embodiment of an energy converter system according to the inventive principles of this patent disclosure. The system of FIG. 1 includes a DC power source section 10, a first power converter section 12, an AC power source section 14, a second power converter section 16 and an energy storage section 18.

The following descriptions relate to the embodiment of FIG. 1, as well as other embodiments described below. A DC power source may be in the form of rechargeable or non-rechargeable battery, fuel cell, solar cells at the cell, multi-cell, panel, multi-panel, module, multi-module or grid level, or any other DC power source thereof, and in any combination thereof. Solar cells may be photovoltaic cells, including monocrystalline, polycrystalline, thin film, etc. An AC power source may be in the form of an electric grid, consumer electronics, e.g., uninterruptable power supply (UPS), or any other AC power sources thereof, and in any combination thereof. Any AC sources, distribution systems, components, etc., may be single phase and/or multi-phase in any configuration. Energy storage may be in the form of a rechargeable or non-rechargeable battery, capacitor, inductor, other charge storage device and/or element, or any combination thereof. An AC power combiner may combine sources in series or parallel combination depending for example on the application of the power converter system. An AC power combiner may combine the voltages and/or currents and/or frequency and/or phase of the individual AC sources in any manner, but preferably in a constructive manner and/or at high efficiency. AC power combining may be single phase and/or multi-phase. A DC power combiner may combine sources in series or parallel combination depending for example on the application of the power converter system. A DC power combiner may combine the voltages and/or currents of the individual DC sources in any manner, but preferably in a constructive manner and/or at high efficiency.

Referring again to FIG. 1, the system may include one or more power combiners, one or more DC power sources, one or more AC power sources and one or more energy storage devices. The energy converter may convert DC power to AC power and vice versa. The energy converter may include one or more inverters to convert DC power to one or more AC power sources, for example, at high efficiency. The energy converter may also consist of one or more rectifiers to convert AC power to one or more DC power sources and/or for storage on energy storage devices, for example, at high efficiency. Each DC power combiner and AC power combiner may combine power in series or parallel combination in any manner, preferably constructively and/or at high efficiency. For DC power combining, one or more DC power sources and/or energy storage devices may be combined in series and/or parallel combination preferably in a constructive manner. For AC power combining, one or more AC power sources may be combined in series or parallel combination preferably in a constructive manner. AC power combining may be single phase and/or multi-phase.

Energy may be transferred from one or more DC power sources through one or more inverters to generate one or more AC sources when power is available at the DC power source and/or when energy is required at the AC power sources. For example, DC power from one or more photovoltaic cells may be transferred to one or more AC power grids and/or consumer electronic devices.

Energy may also be transferred from one or more AC power sources via one or more rectifiers to one or more DC power sources when power is available at the AC power source and/or when energy is required at the DC power sources and/or when energy storage is required. For example, power from one or more AC power grids may be transferred to one or more batteries and/or capacitors.

The number of DC power sources that may be combined by one or more DC power combiners may be any number between 1 and H, where H may be any positive integer. The number of DC power combiners may be any number between 1 and W, where W may be any positive integer. The DC power combiner may not be required to be part of the energy converter system depending, for example, on the application preferably when all the DC source has known and/or fixed voltage and/or current characteristic. There may be one or more rectifiers and/or inverters connected between the DC power sources and the AC power sources to, for example, convert energy from DC-AC and vice versa. The number of rectifiers may be any number between 0 and J, where J may be any positive integer. The number of inverters may be any number between 0 and K, where K may be any positive integer.

The number of AC power sources that may be combined with an AC power combiner may be any number between 1 and L, where L may be any positive integer. The number of AC power combiners between the AC power sources and power converters that are connected to DC power sources may be any number between 1 and X, where X may be any positive integer. The number of AC power combiners between the AC power sources and power converters that are connected to energy storage devices may be any number between 1 and Y, where Y may be any positive integer. The AC power combiners may not be required to be part of the energy converter system depending, for example, on the application preferably when all the AC sources have known and/or fixed voltage and/or current and/or frequency and/or phase characteristics.

There may be one or more rectifiers and/or inverters connected between the AC power sources and the energy storage devices to, for example, convert energy from DC-AC and vice versa. The number of rectifiers may be any number between 0 and N, where N may be any positive integer. The number of inverters may be any number between 0 and M, where M may be any positive integer. The number of energy storage devices that may be combined with DC power combiners may be any number between 1 and P, where P may be any positive integer. The number of DC power combiners on the energy storage devices may be any number between 1 and Z, where Z may be any positive integer. The DC power combiners on the energy storage devices side may not be required to be part of the energy converter system depending, for example, on the application preferably when all the DC sources have known and/or fixed voltage and/or current characteristics.

FIG. 2 illustrates an embodiment of another energy converter system according to the inventive principles of this patent disclosure. The system of FIG. 2 includes a DC power source 20, a first power converter 22, an AC power source 24, a second power converter 26 and an energy storage device 28. The energy converter may convert DC power to AC power and vice versa.

The energy converter may include one or more inverters to convert DC power to one or more AC power sources, for example, at high efficiency. The energy converter may also consist of one or more rectifiers to convert AC power to one or more DC power sources and/or for storage on energy storage devices, for example, at high efficiency. Energy may be transferred from one or more DC power sources through one or more inverters to generate one or more AC sources when power is available at the DC power sources and/or when energy is required at the AC power sources. For example, DC power from one or more photovoltaic cells may be transferred to the one or more AC power grids and/or consumer electronic devices.

Energy may be transferred from one or more AC power sources via one or more rectifiers to one or more DC power sources when power is available at the AC power source and/or when energy is required at the DC power sources and/or when energy storage is required. For example, power from one or more AC power grids may be transferred to one or more batteries and/or capacitors.

FIG. 3 illustrates an embodiment of another energy converter system according to the inventive principles of this patent disclosure. The system of FIG. 3 includes a DC power source 30, a power converter 32, and an AC power source 34. The energy converter may convert DC power to AC power and vice versa.

The energy converter may consist of one or more inverters to convert DC power to one or more AC power sources, for example, at high efficiency. The energy converter may also consist of one or more rectifiers to convert AC power to one or more DC power sources and/or for storage on energy storage devices, for example, at high efficiency.

Energy may be transferred from one or more DC power sources through one or more inverters to generate one or more AC sources when power is available at the DC power source and/or when energy is required at the AC power sources. For example, DC power from one or more photovoltaic cells may be transferred to the one or more AC power grids and/or consumer electronic devices.

Energy may be transferred from one or more AC power sources via one or more rectifiers to one or more DC power sources when power is available at the AC power source and/or when energy is required at the DC power sources and/or when energy storage is required. For example, power from one or more AC power grids may be transferred to create one or more DC power supplies for various applications.

FIG. 4 illustrates an embodiment of another energy converter system according to the inventive principles of this patent disclosure. The system of FIG. 4 includes an AC power source 36, a power converter 38 and an energy storage device 40. The energy converter may convert DC power to AC power and vice versa.

The energy converter may consist of one or more inverters to convert DC power to one or more AC power sources, for example, at high efficiency. The energy converter may also consist of one or more rectifiers to convert AC power to one or more DC power sources and/or for storage on energy storage devices, for example, at high efficiency.

Energy may be transferred from one or more energy storage devices through one or more inverters to generate one or more AC sources when power is available at the energy storage devices and/or when energy is required at the AC power sources. For example, DC power from one or more batteries or capacitors may be transferred to the one or more AC power grids and/or consumer electronic devices.

Energy may be transferred from one or more AC power sources via one or more rectifiers to one or more DC power sources, when power is available at the AC power source and/or when energy is required at the DC power sources and/or when energy storage is required. For example, power from one or more AC power grids may be transferred to one or more batteries and/or capacitors.

Figure 5:
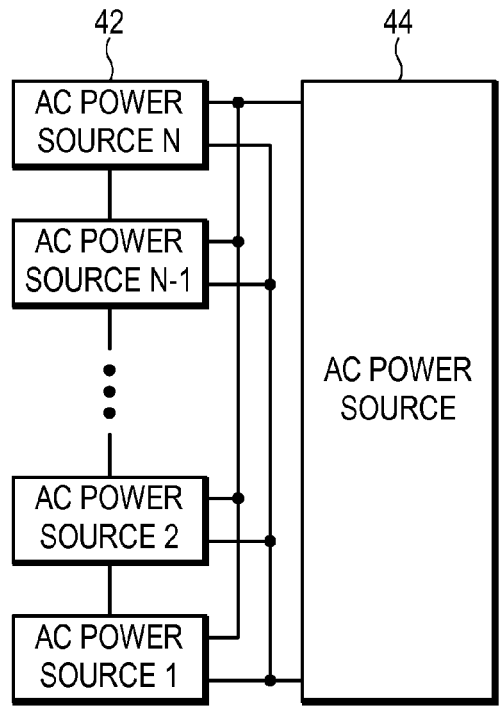
FIG. 5 illustrates an embodiment of power combining circuitry with AC power sources in parallel combination according to the inventive principles of this patent disclosure.

FIG. 5 illustrates an embodiment of power combining circuitry with AC power sources in parallel combination according to the inventive principles of this patent disclosure. The parallel combination of the individual AC power sources 42 may be arranged such that the currents of some or all of the individual AC power sources may be combined in any way to provide the combined AC power source 44, but preferably in a constructive manner. The AC power sources may be phase shifted and/or adjusted so that one or some or all of the AC currents add together constructively. The number of AC power sources that may be combined in parallel combination may be 1 to N, where N is any positive integer.

Figure 6:
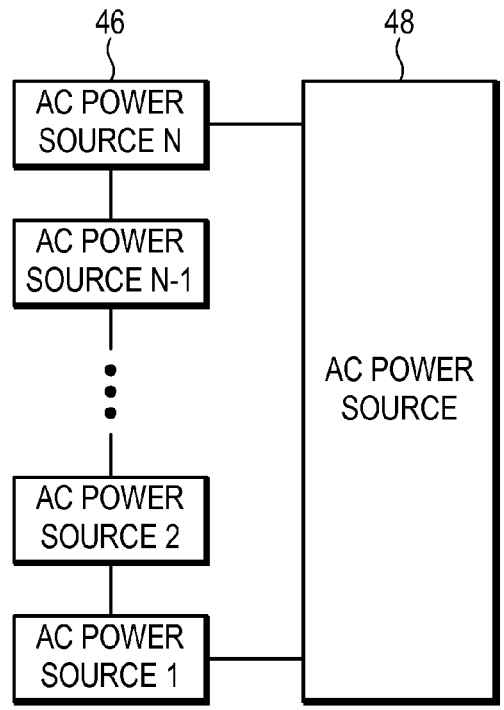
FIG. 6 illustrates an embodiment of power combining circuitry with AC power sources in series combination according to the inventive principles of this patent disclosure.

FIG. 6 illustrates an embodiment of power combining circuitry with AC power sources in series combination according to the inventive principles of this patent disclosure. The series combination of the individual AC power sources 46 may be arranged such that the voltages of some or all of the individual AC power sources may be combined in any way to provide the combined AC power source 48, but preferably in a constructive manner. The AC power sources may be phase shifted and/or adjusted so that one or more or all of the AC voltages add together constructively. The number of AC power sources that may be combined in series combination may be 1 to N, where N is any positive integer. AC power combining may be single phase and/or multi-phase.

Figure 7:
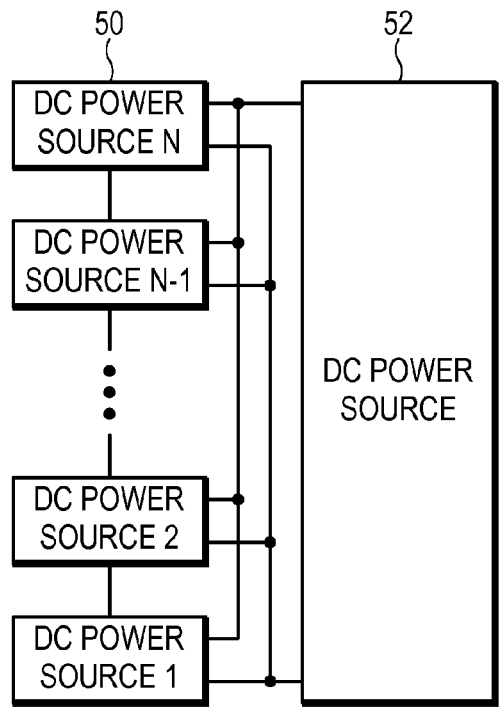
FIG. 7 illustrates an embodiment of power combining circuitry with DC power sources in parallel combination according to the inventive principles of this patent disclosure.

FIG. 7 illustrates an embodiment of power combining circuitry with DC power sources in parallel combination according to the inventive principles of this patent disclosure. The parallel combination of the individual DC power sources 50 may be arranged such that the currents of some or all of the individual DC power sources may be combined in any way to provide the combined DC power source 52, but preferably in a constructive manner. The number of DC power sources that may be combined in parallel combination may be 1 to N, where N is any positive integer.

Figure 8:
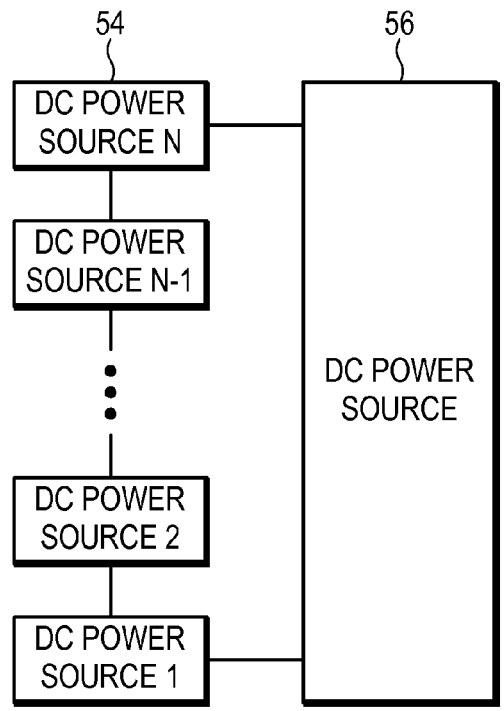
FIG. 8 illustrates an embodiment of power combining circuitry with DC power sources in series combination according to the inventive principles of this patent disclosure.

FIG. 8 illustrates an embodiment of power combining circuitry with DC power sources in series combination according to the inventive principles of this patent disclosure. The series combination of the individual DC power sources 54 may be arranged such that the voltages of some or all of the individual DC power sources may be combined in any way to provide the combined DC power source 56, but preferably in a constructive manner. The number of DC power sources that may be combined in series combination may be 1 to N, where N is any positive integer.

Figure 9:
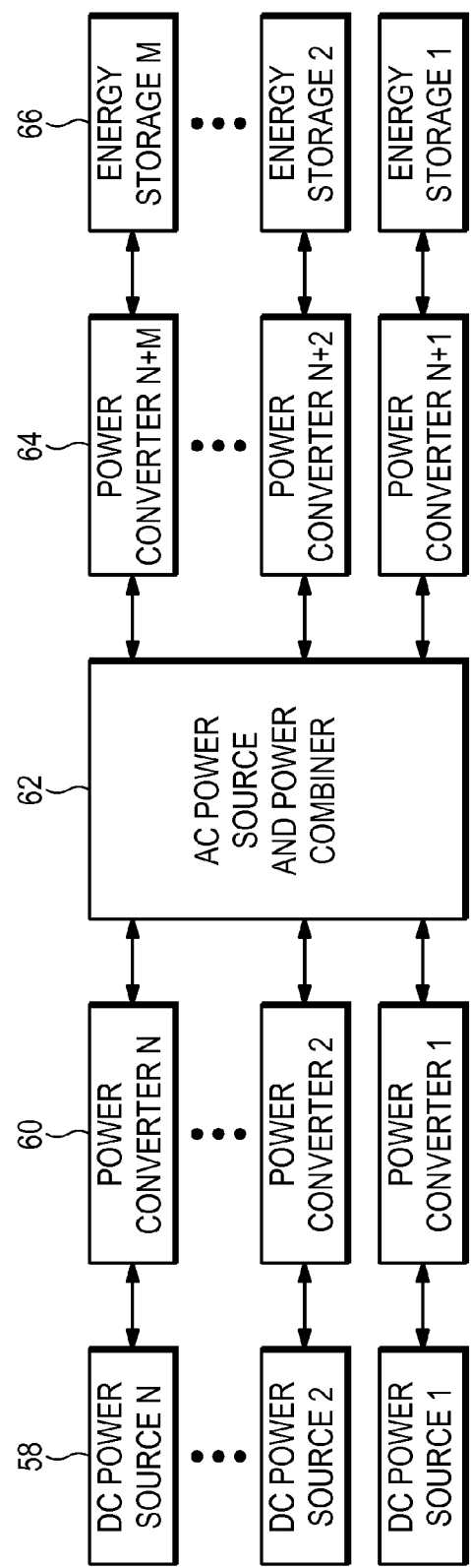
FIG. 9 illustrates an embodiment of a power converter stack-up with an AC power source according to the inventive principles of this patent disclosure.

FIG. 9 illustrates an embodiment of a power converter stack-up with an AC power source according to the inventive principles of this patent disclosure. The embodiment of FIG. 9 includes an AC power source 62, N DC power sources 58 and M energy storage devices 66. The single AC power source may be connected to one or more DC power sources and/or one or more energy storage devices. The single AC power source may include power combining circuitry where AC power may be added, preferably in a constructive manner. The power combining circuitry may provide a parallel and/or series combination where the AC currents at the outputs of one or more or all of the power converters 60 may be added, preferably in a constructive manner. Also, the AC voltages of one or more or all AC of the outputs of power converters 64 may be added, preferably in a constructive manner. AC power combining may be single phase and/or multi-phase.

The number of DC power sources that may be combined in series and/or parallel combination may be 1 to N, where N is any positive integer. The number of energy storage devices that may be combined in series and/or parallel combination may be 1 to M, where M is any positive integer. N may be less than, greater than or equal to M.

Figure 10:
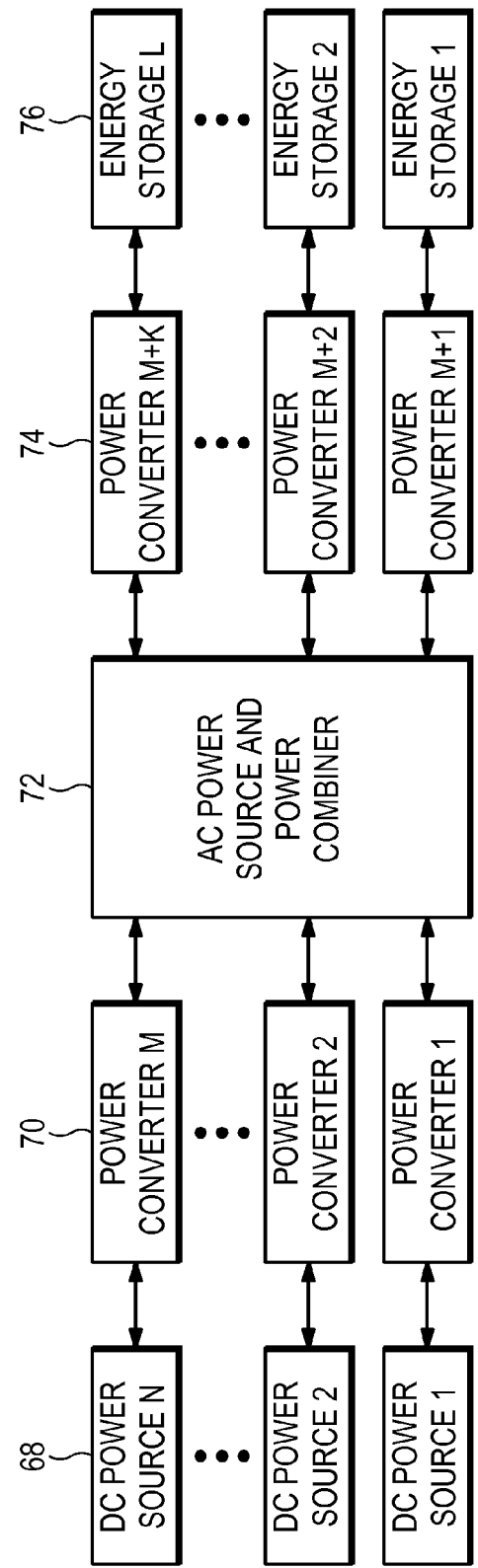
FIG. 10 illustrates another embodiment of a power converter stack-up with an AC power source according to the inventive principles of this patent disclosure.

FIG. 10 illustrates another embodiment of a power converter stack-up with an AC power source according to the inventive principles of this patent disclosure. The embodiment of FIG. 10 includes an AC power source 72, N DC power sources 68 and L energy storage devices 76. The single AC power source may be connected to one or more DC power sources and/or one or more energy storage devices. The single AC power source may include power combining circuitry where AC power may be added, preferably in a constructive manner. The power combining circuitry may provide a parallel and/or series combination where the AC currents of one or more or all of the outputs of power converters 70 may be added, preferably in a constructive manner. Also, the AC voltages of one or more or all of the outputs of power converters 74 may be added, preferably in a constructive manner. AC power combining may be single phase and/or multi-phase.

The number of DC power sources that may be combined in series and/or parallel combination may be 1 to N, where N is any positive integer. The number of power converters on the DC power source side may be 1 to M, where M is any positive integer. The number of power converter on the energy storage side may be 1 to K, where K is any positive integer. The number of energy storage devices that may be combined in series and/or parallel combination may be 1 to L, where L is any positive integer. The number of DC power sources may be less than, greater than or equal to the number of power converters they are connected to. The number of energy storage devices may be less than, greater than, or equal to the number of power converters they are connected to.

Figure 11:
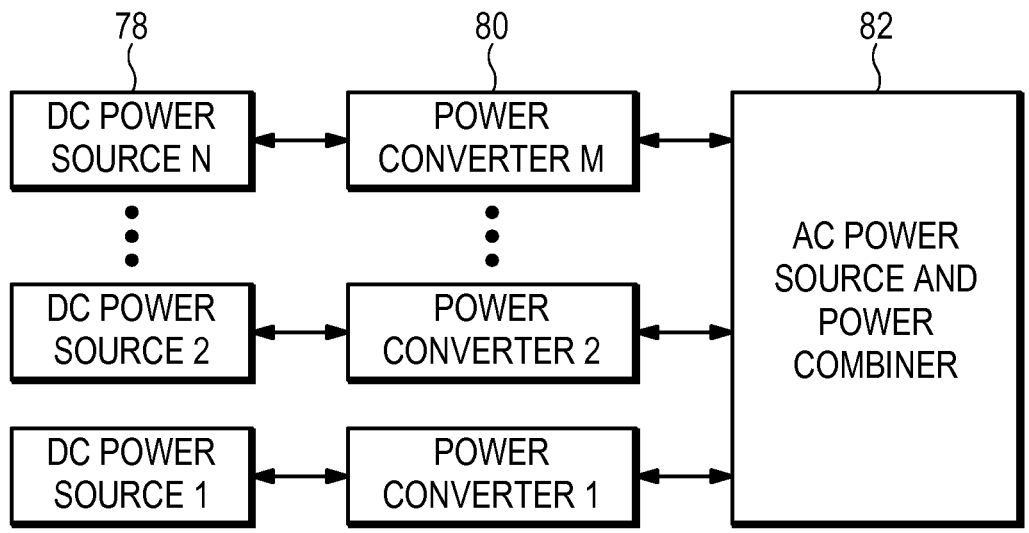
FIG. 11 illustrates another embodiment of a power converter stack-up with an AC power source according to the inventive principles of this patent disclosure.

FIG. 11 illustrates another embodiment of a power converter stack-up with an AC power source according to the inventive principles of this patent disclosure. The embodiment of FIG. 11 includes an AC power source 82 connected to N DC power sources 78. The AC power source may include power combining circuitry where AC power may be added, preferably in a constructive manner. The power combining circuitry may provide a parallel and/or series AC combination where the AC currents of one or more or all of the outputs of power converters 80 may be added, preferably in a constructive manner.

The number of DC power sources that may be combined in series and/or parallel combination may be 1 to N, where N is any positive integer. The number of power converters may be 1 to M, where M is any positive integer. The number of DC power sources may be less than, greater than or equal to the number of power converters they are connected to.

Figure 12:
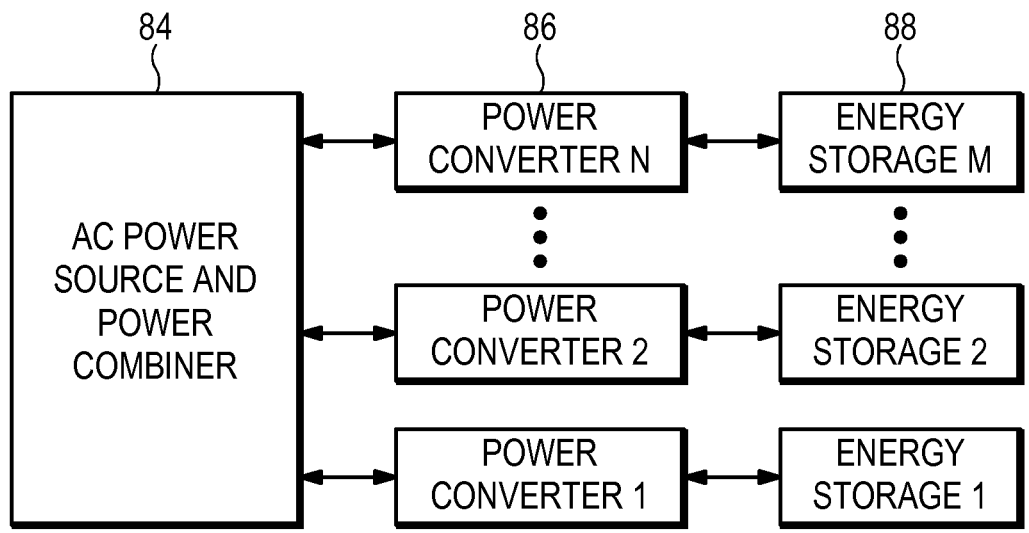
FIG. 12 illustrates another embodiment of a power converter stack-up with an AC power source according to the inventive principles of this patent disclosure.

FIG. 12 illustrates another embodiment of a power converter stack-up with an AC power source according to the inventive principles of this patent disclosure. The embodiment of FIG. 12 includes an AC power source 84 connected to M energy storage devices 88. The single AC power source may include power combining circuitry where AC power may be added, preferably in a constructive manner. The power combining circuitry may provide a parallel and/or series combination where the AC currents of one or more or all AC currents at the outputs of power converters 86 may be added, preferably in a constructive manner.

The number of power converters may be 1 to N, where N is any positive integer. The number of energy storage devices that may be combined in series and/or parallel combination may be 1 to M, where M is any positive integer. The number of energy storage devices may be less than, greater than, or equal to the number of power converters they are connected to.

Figure 13:
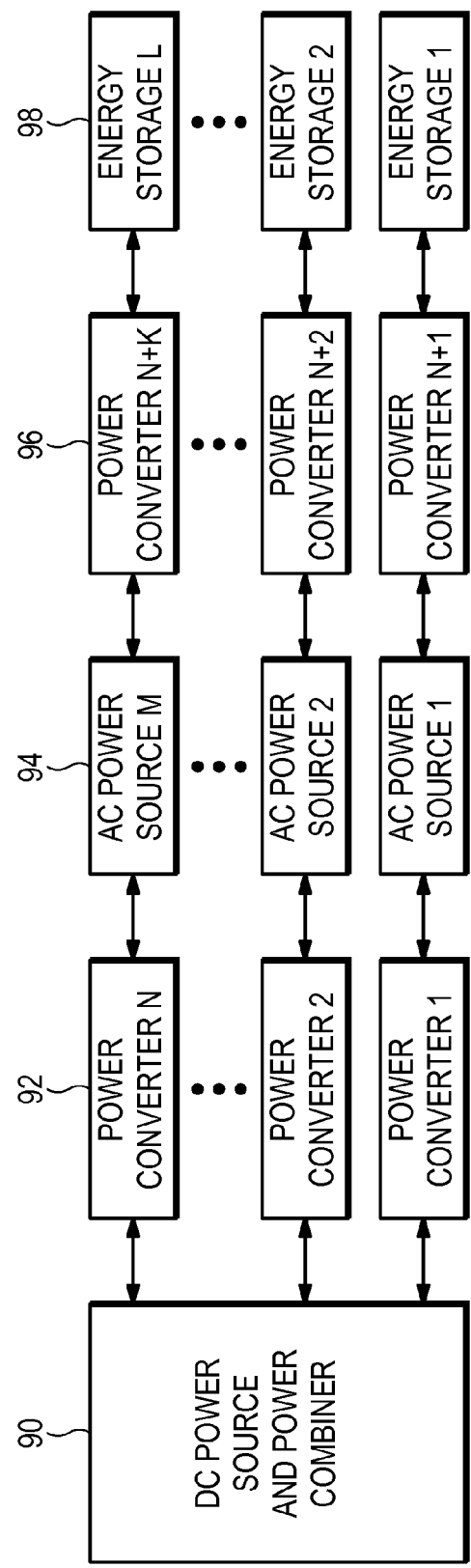
FIG. 13 illustrates an embodiment of a power converter stack-up with a DC power source according to the inventive principles of this patent disclosure.

FIG. 13 illustrates an embodiment of a power converter stack-up with a DC power source according to the inventive principles of this patent disclosure. The embodiment of FIG. 13 includes a DC power source 90, N+K power converters 92 and 96, M AC power sources 94 and L energy storage devices 98. The single DC power source may be connected to one or more of the AC power sources and/or one or more energy storage devices via the power converters. The single DC power source may include power combining circuitry where DC power may be added, preferably in a constructive manner. The power combining circuitry may provide a parallel and/or series combination where the DC currents of one or more or all of the outputs of power converters 92 may be added, preferably in a constructive manner.

The number of power converters on the DC power source side may be 1 to N, where N is any positive integer. The number of AC power sources may be 1 to M, where M is any positive integer. The number of power converter on the energy storage side may be 1 to K, where K is any positive integer. The number of energy storage devices that may be combined in series and/or parallel combination may be 1 to L, where L is any positive integer. The number of energy storage devices and/or AC power sources may be less than, greater than, or equal to the number of power converters they are connected to.

Figure 14:
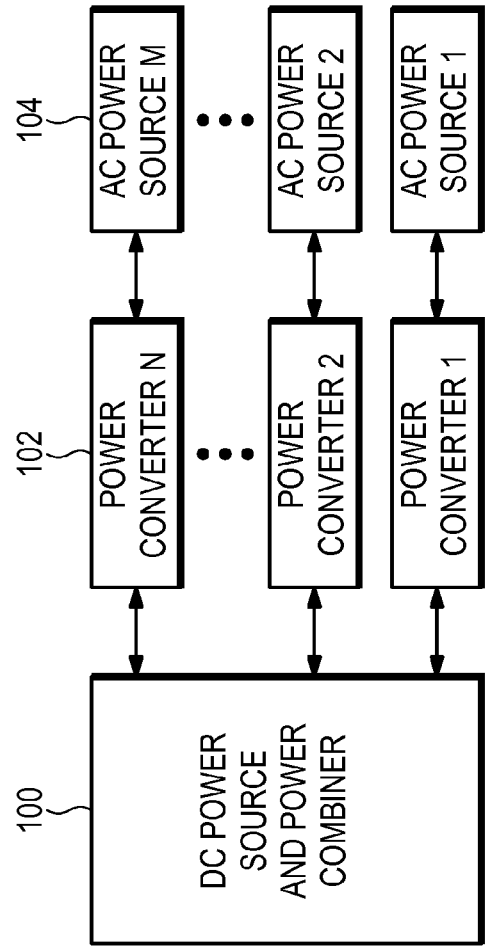
FIG. 14 illustrates another embodiment of a power converter stack-up with a DC power source according to the inventive principles of this patent disclosure.

FIG. 14 illustrates another embodiment of a power converter stack-up with a DC power source according to the inventive principles of this patent disclosure. The embodiment of FIG. 14 includes a DC power source 100, N power converters 102 and M AC power sources 104. The single DC power source may be connected to one or more AC power sources via power the converters 102. The single DC power source may include power combining circuitry where DC power may be added, preferably in a constructive manner. The power combining circuitry may provide a parallel and/or series combination where the DC currents of one or more or all outputs of the power converters may be added, preferably in a constructive manner.

The number of power converters may be 1 to N, where N is any positive integer. The number of AC power sources may be 1 to M, where M is any positive integer. The number of AC power sources may be less than, greater than, or equal to the number of power converters they are connected to.

FIG. 15 illustrates an embodiment of a power converter stack-up with an energy storage device according to the inventive principles of this patent disclosure. The embodiment of FIG. 15 includes an energy storage device 114, M+L power converters 108 and 112, N DC power sources 106, and K AC power sources 110. The single energy storage device may be connected to one or more DC power sources and/or one or more AC power sources via the power converters. The single energy storage device may include power combining circuitry where DC power may be added, preferably in a constructive manner. The power combining circuitry may provide a parallel and/or series combination where the DC currents of one or more or all of the outputs of the power converters may be added, preferably in a constructive manner.

The number of DC power sources may be 1 to N, where N is any positive integer. The number of power converters on the DC power source side may be 1 to M, where M is any positive integer. The number of AC power sources may be 1 to K, where K is any positive integer. The number of power converters on the energy storage side may be 1 to L, where L is any positive integer. The number of AC power sources and/or DC power sources may be less than, greater than, or equal to the number of power converters they are connected to.

FIG. 16 illustrates another embodiment of a power converter stack-up with an energy storage device according to the inventive principles of this patent disclosure. The embodiment of FIG. 16 includes an energy storage device 120, M power converters 118, and N AC power sources 116. The single energy storage device may be connected to one or more AC power sources via the power converters. The single energy storage device may include power combining circuitry where DC power may be added, preferably in a constructive manner. The power combining circuitry may provide a parallel and/or series DC combination where the DC currents of one or more or all of the outputs of the power converters may be added, preferably in a constructive manner.

The number of AC power sources may be 1 to N, where N is any positive integer. The number of power converters may be 1 to M, where M is any positive integer. The number of AC power sources may be less than, greater than, or equal to the number of power converters they are connected to.

Figure 17:
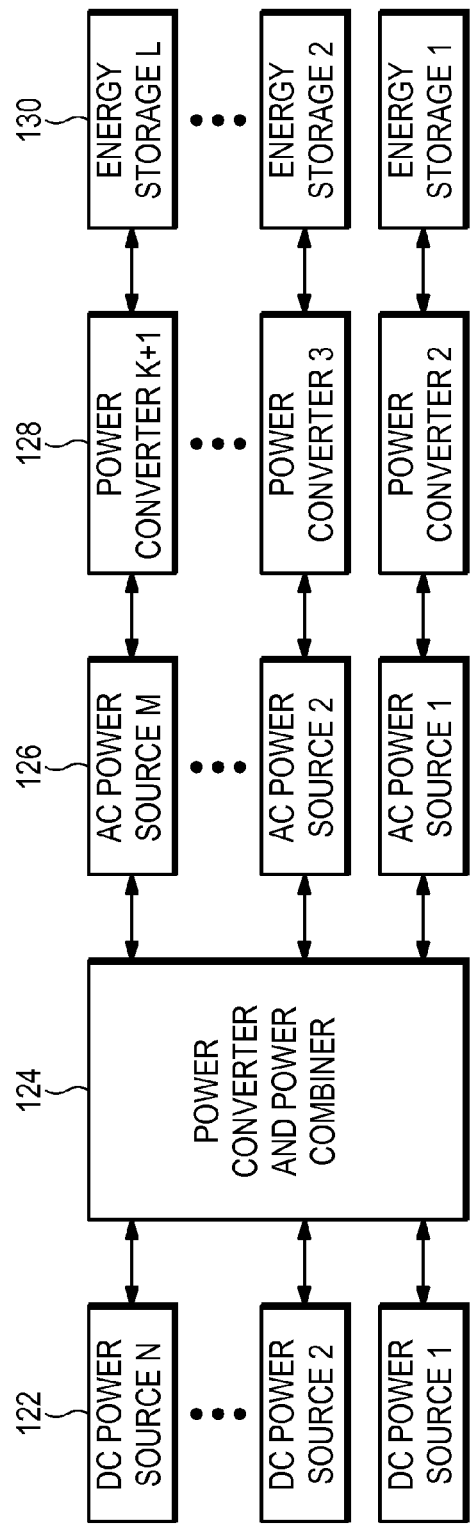
FIG. 17 illustrates an embodiment of a power converter stack-up with a power converter and power combiner according to the inventive principles of this patent disclosure.

FIG. 17 illustrates an embodiment of a power converter stack-up with a power converter and power combiner according to the inventive principles of this patent disclosure. The embodiment of FIG. 17 includes a power converter and power combiner 124, energy storage devices 130, power converters 128, AC power sources 126 and DC power sources 122. The power converter and combiner may be connected to one or more AC power sources and/or DC power sources and/or energy storage devices.

The number of DC power sources may be 1 to N, where N may be any positive integer. The number of AC power sources may be 1 to M, where M may be any positive integer. The number of power converters may be 1 to K, where K may be any positive integer. The number of energy storage devices may be 1 to L, where L is any positive integer.

Figure 18:
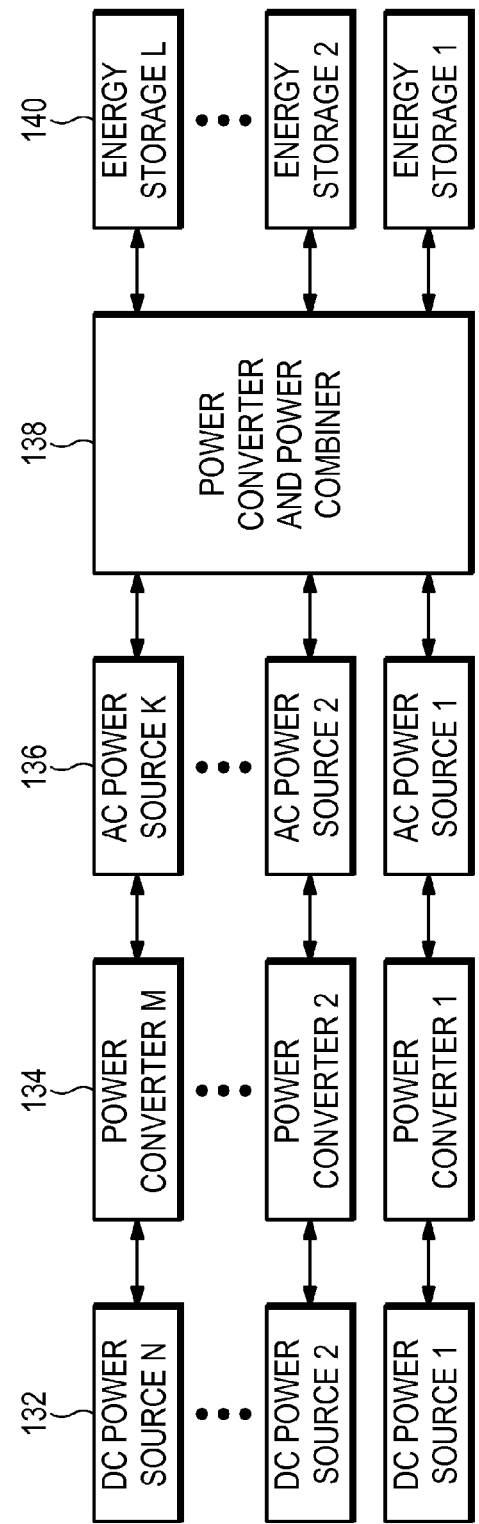
FIG. 18 illustrates another embodiment of a power converter stack-up with a power converter and power combiner according to the inventive principles of this patent disclosure.

FIG. 18 illustrates another embodiment of a power converter stack-up with a power converter and power combiner according to the inventive principles of this patent disclosure. The embodiment of FIG. 18 includes a power converter and power combiner 138, energy storage devices 140, power converters 134, AC power sources 136 and DC power sources 132. The power converter and combiner may be connected to one or more AC power sources and/or DC power sources and/or energy storage devices.

The number of DC power sources may be 1 to N, where N may be any positive integer. The number of power converters may be 1 to M, where M may be any positive integer. The number of AC power sources may be 1 to K, where K may be any positive integer. The number of energy storage devices may be 1 to L, where L is any positive integer.

Figure 19:
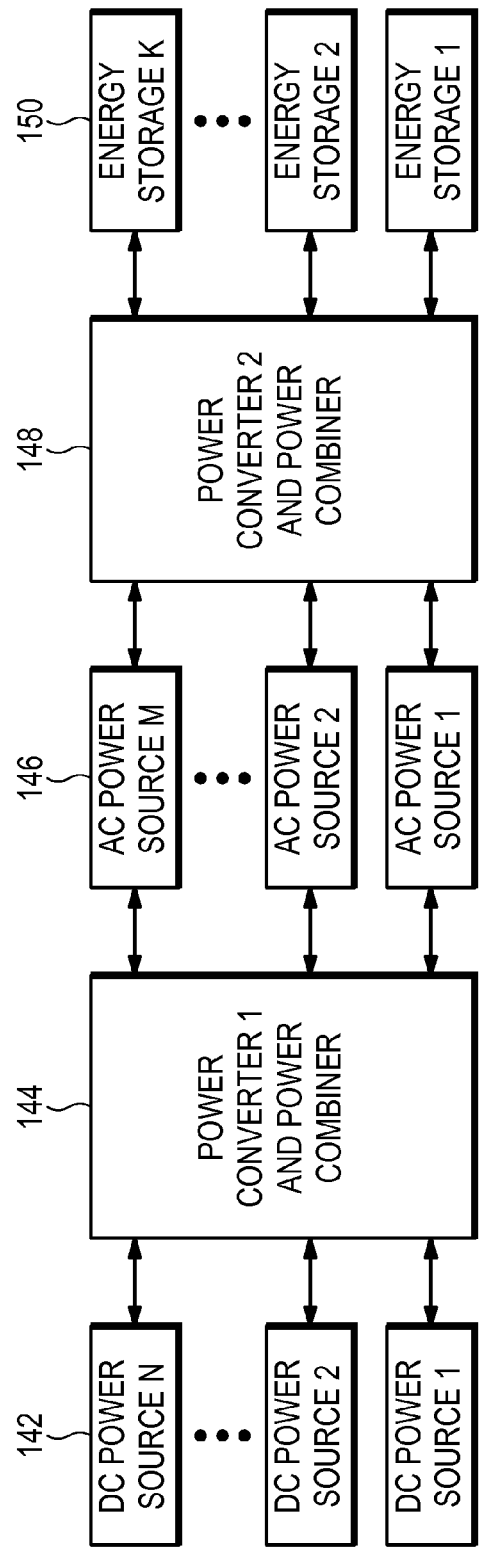
FIG. 19 illustrates an embodiment of a power converter stack-up with two power converters and power combiners according to the inventive principles of this patent disclosure.

FIG. 19 illustrates an embodiment of a power converter stack-up with two power converters and power combiners according to the inventive principles of this patent disclosure. The embodiment of FIG. 19 includes DC power sources 142, a first power converter and power combiner 144, AC power sources 146, a second power converter and power combiner 148, and energy storage devices 150. The DC power sources may be connected to the first power converter and power combiner. The AC power sources may be connected between the first and second power converters and power combiners. The energy storage devices may be connected to the second power converter and power combiner.

The number of DC power sources may be 1 to N, where N may be any positive integer. The number of AC power sources may be 1 to M, where M may be any positive integer. The number of energy storage devices may be 1 to K, where K is any positive integer.

Figure 20:
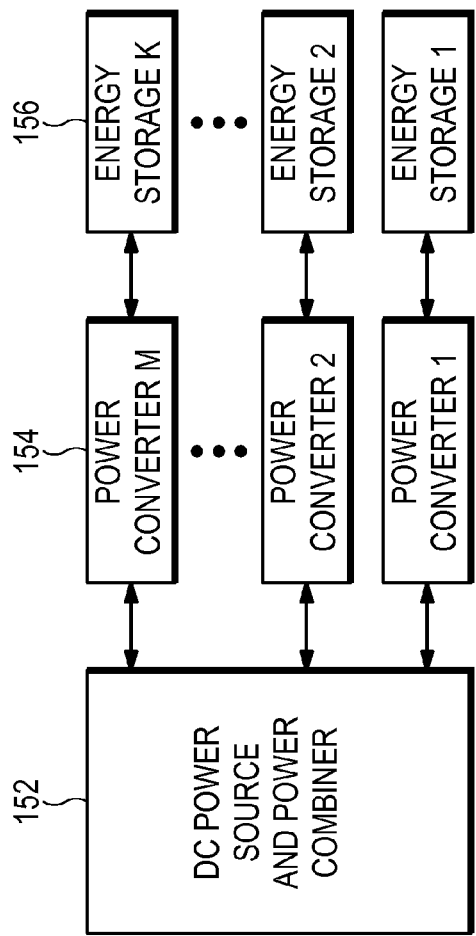
FIG. 20 illustrates an embodiment of a power converter stack-up with a DC power source and power combiner according to the inventive principles of this patent disclosure.

FIG. 20 illustrates an embodiment of a power converter stack-up with a DC power source and power combiner according to the inventive principles of this patent disclosure. The embodiment of FIG. 20 includes a DC power source and power combiner 152 which may be connected to energy storage devices 156 through power converters 154. The number of power converters may be 1 to M, where M may be any positive integer. The number of energy storage devices may be 1 to K, where K is any positive integer.

Figure 21:
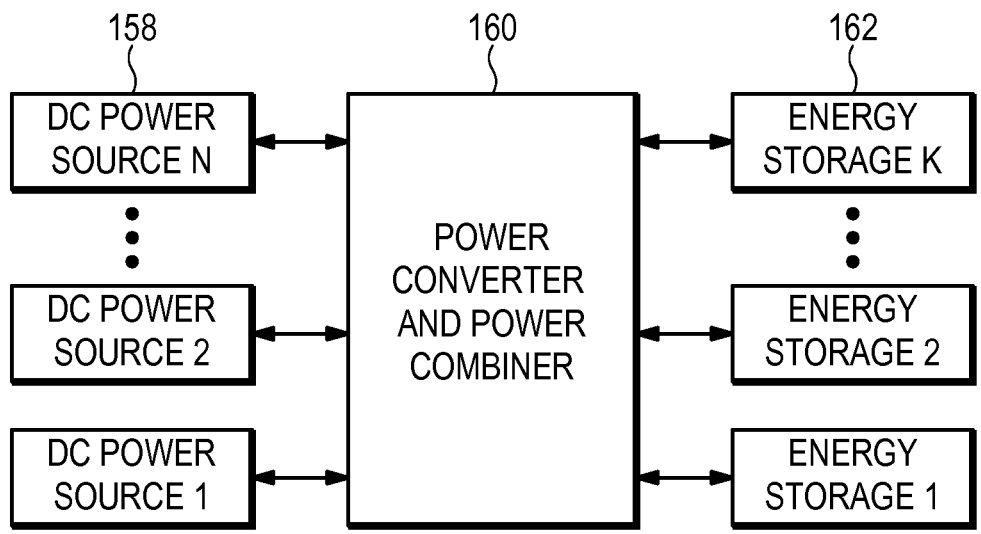
FIG. 21 illustrates an embodiment of a power converter stack-up with a power converter and power combiner according to the inventive principles of this patent disclosure.

FIG. 21 illustrates an embodiment of a power converter stack-up with a power converter and power combiner according to the inventive principles of this patent disclosure. The embodiment of FIG. 21 includes a power converter and power combiner 160, DC power sources 158, and energy storage devices 162. The number of DC power sources may be 1 to N, where N may be any positive integer. The number of energy storage devices may be 1 to K, where K is any positive integer.

Figure 22:
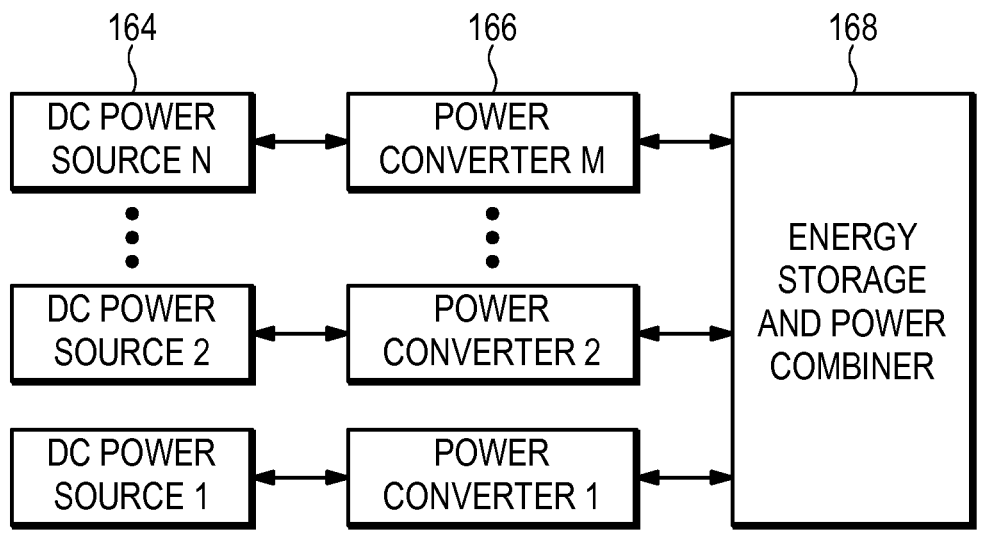
FIG. 22 illustrates an embodiment of a power converter stack-up with an energy storage device and power combiner according to the inventive principles of this patent disclosure.

FIG. 22 illustrates an embodiment of a power converter stack-up with an energy storage device and power combiner according to the inventive principles of this patent disclosure. The embodiment of FIG. 22 includes an energy storage device and power combiner 168 which may be connected to DC power sources 164 through power converters 166. The number of DC power sources may be 1 to N, where N may be any positive integer. The number of power converters may be 1 to M, where M is any positive integer.

Figure 23:
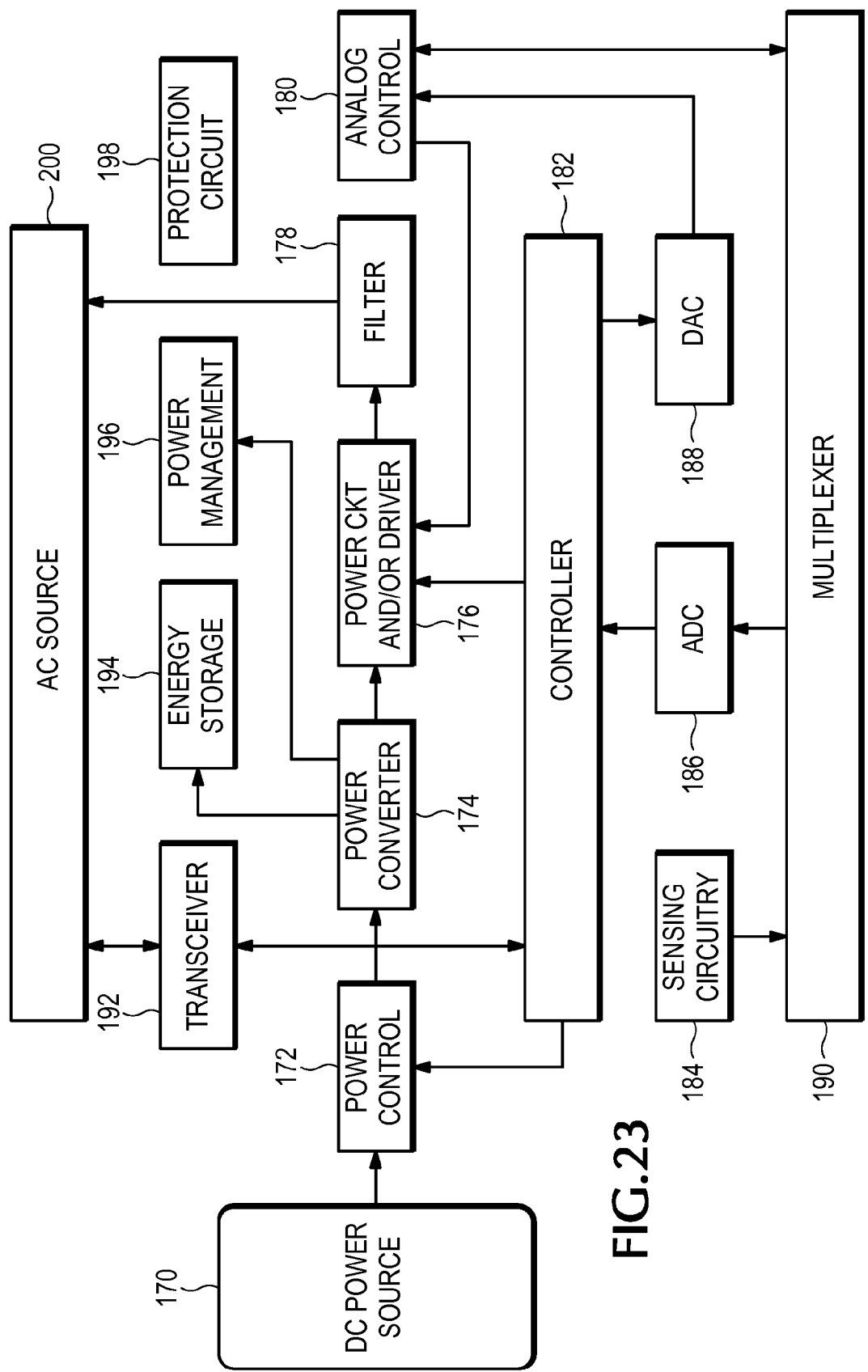
FIG. 23 illustrates an embodiment of an inverter system according to the inventive principles of this patent disclosure.
Figure 24:
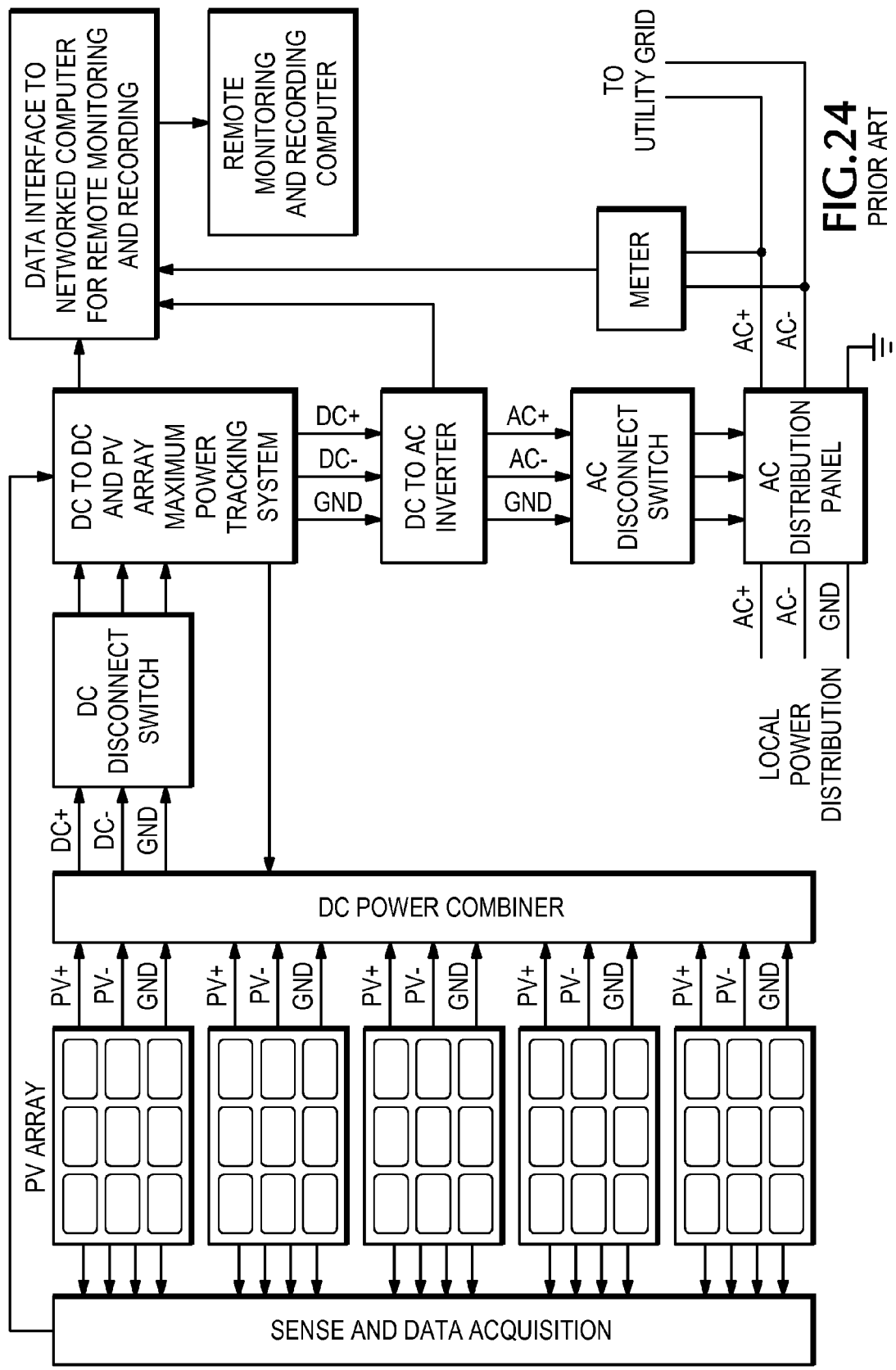
FIG. 24 illustrates a prior art photovoltaic (PV) energy system for delivering solar energy to a utility grid.

FIG. 23 illustrates an embodiment of an inverter system according to the inventive principles of this patent disclosure. The system of FIG. 23 may be designed to convert DC power from any type of DC power source 170 to AC power. The AC power inverter may be single phase and/or multi-phase. It may include one or more power controls 172, one or more power converters 174, one or more power circuits and/or drivers 176, one or more filters 178, one or more analog control blocks 180, one or more digital signal processors (DSPs) 182, one or more sensing circuits 184, one or more analog-to-digital converters (ADCs) 186, one or more digital-to-analog converters (DACs) 188, one or more multiplexer circuits 190, one or more transceivers 192, one or more energy storage devices 194, one or more power management blocks 196, and one or more protection circuits 198.

The power control block 172 may control the power that flows through the inverter circuits. For example, it may be designed to maximize the power conversion efficiency of the inverter. It may also be include maximum power point tracking (MPPT) to assure the inverter is operating at the maximum power available from the DC power source. The power control block may also be designed to control power in the inverter in response to changes in the environment, for example, variations in temperature, and/or pressure, and/or humidity, and/or light illumination, and/or availability of input DC power. The power control block may also be designed to accommodate other operational factors, for example, variations in integration process whether inter-process, intra-process and/or voltage supply.

The power converter 174 may convert one or more DC input voltages and/or currents to one or more DC output voltages and/or currents, preferably at high power conversion efficiency. The power converter may be designed to step-up (i.e. boost) the input DC voltage to a higher output DC voltage and/or step-down (i.e. buck) the input DC voltage to a lower output DC voltage depending on, for example, the specific application the inverter system is intended for. The power converter circuit may also be designed to provide both step-up and step-down (i.e. buck-boost/boost-buck) operation and/or to generate multiple output DC voltages from a single input (e.g. as in a fly-back converter). The input voltages to, and output voltages from, the power converter may be a positive or negative signals. The output voltages may be of the same polarity different polarity relative to the input voltages depending, for example, on the specific application that the inverter system is intended for. The DC power converter circuit may be in the form of a linear and/or a switching regulator. Pulse width modulated signals may be used to control one or more output voltages of the DC power conversion, for example, in switching voltage regulators.

The power circuits and/or drivers block (power driver circuit) 176 may convert one or more DC voltages and/or currents to one or more AC voltages and/or currents preferably at high power conversion efficiency and/or low total harmonic distortion (THD). Passive or active filters may be included within the power driver circuit, for example, to reduce harmonic distortion in the DC-AC power conversion. Power switches may also be implemented within the power driver circuit, for example, to drive high power AC devices and/or to withstand high output voltages.

The protection circuit 198 may be included to protect the inverter system and/or protect any or all circuitry connected to the inverter system. The protect circuitry may limit the voltage, and/or current, and/or temperature of the circuitry it protects from exceeding a certain range, for example, to protect it from damage. The protection circuitry may have over-voltage protection capability and/or under-voltage protection capability to limit the voltage range of the inverter system and/or the circuitry it is protecting. The protection circuitry may also have over-current and/or under-current protection capability to limit the current range of the inverter system and/or the circuitry it is protecting. The protection circuitry may also have over-temperature and/or under-temperature protection capability to limit the current range of the inverter system and/or the circuitry it is protecting.

The filter block 178 may include active and/or passive circuitry. The filter may be designed to reduce the total harmonic distortion (THD) in the inverter system. The filter may be low pass, high pass, band pass and/or band reject depending, for example, on the intended purpose of the filter. The filter may be designed with only passive elements, for example, resistors and/or capacitors and/or inductors, or the filter may include active components, for example, operational amplifiers (op amps).

Analog control block 180 may be included to provide analog control of the power converter and/or driver circuitry, preferably to improve power conversion efficiency. The analog control may be designed as a feed back loop to the DC-DC power converter and/or DC-AC power driver circuitry, for example, to dynamically control and maximize the power conversion efficiency of these circuit blocks.

Sensing circuitry 184 may be included to sense voltages and/or currents at any location in the inverter system. The sensing circuit may be designed to sense one or more DC voltages and/or currents at, for example, the DC power source and/or at the output of the DC power converter. The sensing circuit may also be designed to sense one or more AC voltages and/or currents at, for example, the AC power source and/or at the output of the DC-AC power converter and/or power driver circuit.

Energy Storage Device 194 may be in the form of rechargeable or non-rechargeable battery, inductor, capacitor, other charge storage device and/or element, or any combination thereof.

Analog/Digital converter (ADC) 186 may be designed to convert one or more analog signals of any form to digital signals. The digital signal to the DSP may be sampled with Nyquist sample, oversampling or any other sampling methods, or any combination thereof. Digital/Analog Converter (DAC) 188 may be designed to convert digital signals to analog signals of any form. The digital signal to the DSP may be sampled with Nyquist sampling, oversampling or any other sampling methods, or any combination thereof.

Digital signal processor (DSP) 182 may be designed and/or optimized, for example, for low power operation and/or for high speed operation. The DSP core may include an internal analog/digital converter to convert analog signal of any form to digital signals. The DSP core may be in the form of application specific integrated circuit (ASIC) and/or field programmable gate arrays depending, for example, on the specific application the inverter system is intended for. The digital signal processor may be designed to process digital signals, for example, in the time domain, and/or frequency domain, and/or spatial domain, and/or wavelet domain and/or autocorrelation domain. The DSP block may consist of random access memory (RAM) that may be read/write or read only memory (ROM) that may be preprogrammed or electrically erasable (i.e. EEPROM). The type of ROM and/or RAM use may be of any type including flash and/or non-volatile memory. The digital signal to the DSP may be sampled with Nyquist sampling, oversampling or any other sampling methods, or any combination thereof. The DSP may be designed to include one or more digital filters, for example, finite impulse response (FIR) filters and/or infinite impulse response (IIR) filters.

The DSP core may be designed to implement maximum power point tracking (MPPT) for the inverter to, for example, assure the inverter is operating at and/or close to the maximum power. Pulse width modulation (PWM) of signals may be implemented with the DSP core to, for example, implement the control circuitry for the DC-DC power converter. The DSP may be programmed to act as an active filter for reducing harmonic distortion, for example, in the power converter from DC-AC. The DSP may be programmed to control switching of circuitry within the inverter system, for example, the DC-AC power conversion circuit. The DSP may also be programmed to add intelligence to the power control circuit, for example, to find the maximum power point and/or bypassing of damaged or inefficient DC power sources as part of the inverter system.

Multiplexer 190 may be designed to choose between different digital and/or analog input sources. The multiplexer circuitry may be designed to select between the different sensing circuitry (for example) voltage and/or current sensing and/or any other digital and/or analog signal.

Transceiver 192 may be design to communicate through circuitry outside of the inverter for example, through the power line and or wireless links. The transceiver may include a line interface circuit to, for example, interface the power grid to the transceiver. The transceiver may include one or more low noise amplifiers (LNA) to, for example, amplify the receive signal with low noise figure and/or high gain. The transceiver may include automatic gain control (AGC), for example, to automatically control the gain of the receiver. The transceiver may include driver circuits, for example, to drive the transmitted signals at high gain and/or efficiency. The transceiver may include a buffer circuit, for example, to amplify the signal to the driver circuitry. The transceiver may include on or more filters, for example, to filter unwanted frequency contents, i.e. high frequency noise. The transceiver may include its own ADC and DAC, for example, to convert analog signals to digital signal and vice versa.

Power management block 196 may be designed to supply a stable DC power source to the inverter system. Power management may include one or more switches or circuitry which controls, monitors and/or analyzes (i) the power conversion operation of the inverter system and/or components thereof (for example, the DC-DC and/or DC-AC power conversion circuitry) (ii) the operating characteristics of the inverter and/or components thereof, (iii) the characteristics of the output power of the inverter system (for example, current, voltage and temporal characteristics thereof), (iv) the storage operation of one or more of the charge storage or other energy storage devices and/or charge or energy supplied thereto (via, for example, the inverter system), and/or (v) the characteristics of the output power of one or more of the charge storage or other energy storage devices (for example, current, voltage and temporal characteristics thereof).

The features described above may be utilized in various combinations according to the inventive principles, and various features may be included or omitted in some embodiments depending on the application. For example, power control may be included when maximum power point tracking (MPPT) is included as part of the system, but may be excluded, for example, when the power coming from the DC power source is fixed and/or when the AC load may be modulated to operate at the peak output power. As another example, DC power conversion may not be included as part of the inverter when DC voltage and/or current is sufficient for direct conversion to AC voltage and/or current. Filters may not be included as part of the inverter system when, for example, the total harmonic distortion of the inverter system does not need to be suppressed and/or when the number of external components may be minimized to reduce system cost. The analog control block may not be included, for example, when feedback from the analog control is not required and/or when the DC-DC and DC-AC power converters does not need to be dynamically controlled and/or when power conversion efficiency of these circuit blocks does not need to be maximized.

The digital signal processor (DSP) may not be included as part of the inverter system when, for example, digital processing is not required by the inverter system and/or when the inverter system requirements are simple to reduce cost and/or when the operation required of the DSP can be reproduced with other internal and/or external circuitry. The sensing circuitry may not be included as part of the inverter system when, for example, no DC and/or AC is needed for maximum power point tracking and/or monitoring of the AC load is not needed. The multiplexer circuitry may not be included as part of the inverter system when, for example, when multiplexing of analog and/or digital signals is not required. The transceiver circuitry may not be included when, for example, data transmission of any kind is not needed. An energy storage device may not be included as part of the inverter system when, for example, energy storage of any kind is not needed. The power management feature may not be included when, for example, power management and/or power control and/or power conditioning of any kind is not needed. Protection circuitry may not be included as part of the inverter system when, for example, the inverter system has externally connected protection circuitry and/or the voltages and/or current and/or temperature of the protection circuit may be externally controlled.

Figure 25:
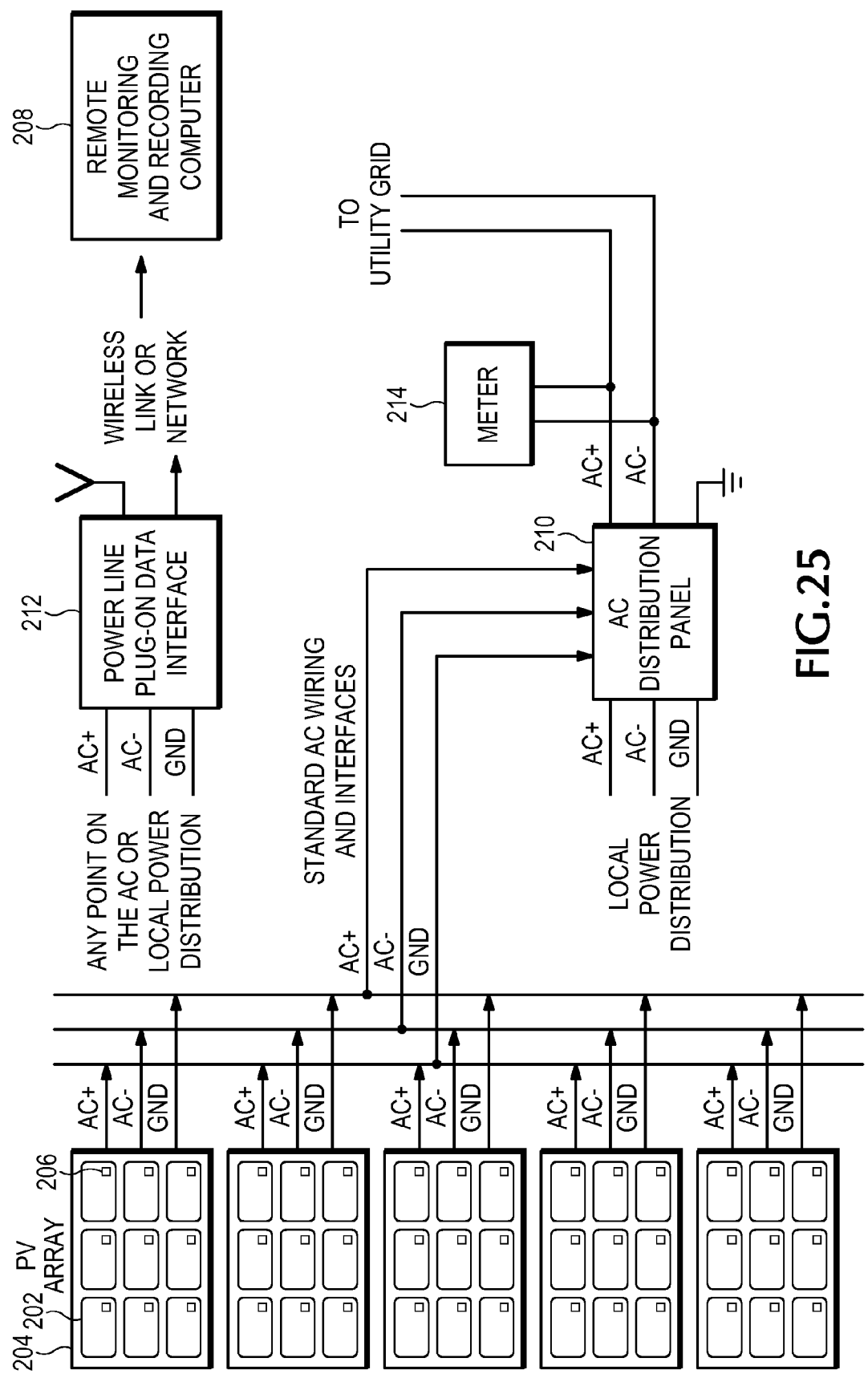
FIG. 25 illustrates an embodiment of a photovoltaic (PV) energy system according to the inventive principles of this patent disclosure.

FIG. 25 illustrates an embodiment of a photovoltaic (PV) energy system according to the inventive principles of this patent disclosure. The system of FIG. 25 may include a PV array of one or more solar cells 202 and/or solar panels 202 and/or modules and/or solar grids, one or more integrated power converters 206, one or more remote monitoring and/or recording computers 208, one or more AC distribution panels 210, one or more power line data interfaces 212, one or more meters 214 and/or AC wiring.

The photovoltaic power conversion may be performed at the cell, and/or multi-cell, and/or panel, and/or multi-panel, and/or module, and/or multi-module, and/or grid level.

In some embodiments, an integrated power converter may be fabricated entirely on a single integrated circuit (IC) (or "chip"), including all passive components. In other embodiments, it may be preferable to have the largest passive components such as inductors, transformers and capacitors located off the IC. In some other embodiments, the integrated power converter may be fabricated on multiple ICs, for example in a multi-chip module (MCM), in which case various key active or passive components may be located on the same chip or chips as the remainder of the semiconductor devices and/or on a separate chip or chips and/or off-chip, for example, on a common substrate within the package or packages or outside the package or packages.

An integrated power converter may be designed to, for example, reduce the cost of the solar energy conversion system and/or improve the power conversion efficiency and/or improve system reliability and/or improve diagnostics and maintenance. By integrating one or more functions of an inverter system on an integrated circuit, an integrated power converter may be able to implement these functions at more relaxed specifications.

Remote monitoring/recording Computer 208 may record power output of the solar energy conversion system at, for example, the cell level. It may be designed to, for example, monitor shading effects of the individual solar cell and or monitor which solar cell and/or group of solar cells are not operating and/or inefficiently operating.

AC distribution panel 210 may be designed to divide the main electrical lines and/or source into various electrical circuits. The AC distribution panel may consist of one or more fuses and/or one or more circuit breakers and/or one or more main switches.

Power line data interface 212 may be designed to communicate across the power line to the remote monitoring/recording computer. The power line data interface may consist of a wireless link to communicate with the remote monitoring/recording computer. The power line data interface may also be designed to receive critical data.

The system of FIG. 25 may reduce the cost of a solar energy system, for example, by reducing the number of external components and/or number of magnetic components. An integrated power converter implementation may be designed to, for example, reduce or eliminate DC wiring and/or cabling issues, and/or reduce or eliminate cable trays or conduits, and/or reduce or eliminate DC fuses and/or connectors. With reduced or no DC wiring, no DC surge protection and/or junction box and/or ground fault detection and/or protection devices may be required. With no DC wires, DC training and/or certifications are not required for the installation of such a system.

With the inverter functions distributed in an integrated power converter implementation, the power driving capacity and voltage across each individual integrated power converter may be reduced. Reducing the power driving and voltage driving specifications of the integrated power converter may reduce the cost of the individual integrated power converters. Fewer or no blocking diodes may be required at lower power drive and/or less or no integration of bypass diodes are required. At lower voltages across the integrated power converter, the integrated power converter may be designed in standard high-voltage CMOS processes and may be designed to increase power conversion efficiency of the solar energy system.

Integration of one or more inverter functions in a high voltage CMOS process and/or at lower power may reduce noise in the system and/or improve electromagnetic interference and/or may improve localized maximum power point tracking (MPPT). With the inverter integrated on a chip, the assembly process of the solar energy system may be made very simple to reduce the assembly cost associated with the system. The individual inverter may be designed and packaged such that it is easily integrated into the solar energy system assembly. The packaging of a solar energy system at the panel and/or module level may be implemented so that additional panels and/or modules may be easily added or removed. The integrated power converter implementation may be designed for adaptive islanding where power in the whole array is not lost and/or for improved reliability and/or better grid reliability and/or component reliability due to lower voltage and power scaling. It may also be designed to automatically resolve cross circulatory current with natural load distribution and/or with active harmonic control and/or for easy implementation of advanced control algorithms.

A distributed inverter system according to the inventive principles of this patent disclosure may be designed such that it is optimized for lower system cost, and/or higher system performance, and/or improved reliability, and/or ease of integration, and/or diagnostics and maintenance. Diagnostics and/or maintenance may be improved by, for example, reducing ground fault detection and/or eliminating the need for inverter shelter and/or adding the ability to detect faulty circuitry remotely and/or automatically detect faulty and/or dead inverters.

Compared to conventional inverter systems, a distributed inverter method according to the inventive principles of this patent disclosure may be optimized for lower system cost, for example, by reducing or eliminating altogether the number of external and/or custom off the shelf components, and/or high cost components (for example transformers) and/or DC wiring and/or DC cable trays and/or conduits and/or fuses and/or over current protection circuitry and/or required holders and/or DC connectors, and/or DC surge protection circuitry, and/or junction boxes, and/or blocking diodes, and/or heavy duty electronics (e.g. transformers).

Other cost saving advantages may be realized since standard AC side wiring is typically less expensive and/or requires little or no specialized DC training and certification. Additional cost savings may be realized because of natural integration and/or replacement of PV modules and/or bypass diodes and/or adaptation to shadowing of small to large size areas of a PV structure and/or reduction in the amount of equipment to ship and/or handle and/or mount a modular stackable array.

The distributed inverter methods according to the inventive principles of this patent disclosure may be optimized for higher energy output and/or increased energy extraction and/or increased power conversion efficiency, for example, by limiting or eliminated the losses due to shadowing in photovoltaic systems. Methods of increasing energy extraction and/or increased power conversion efficiency may include but are not limited to implementation of localized maximum power point tracking of individual input DC sources.

FIGS. 26-29 illustrate embodiments of integrated power converter arrangements according to the inventive principles of this patent disclosure. An integrated power converter may be installed at the cell, and/or multi-cell, and/or panel, and/or multi-panel, and/or module, and/or multi-module, and/or grid level.

Figure 26:
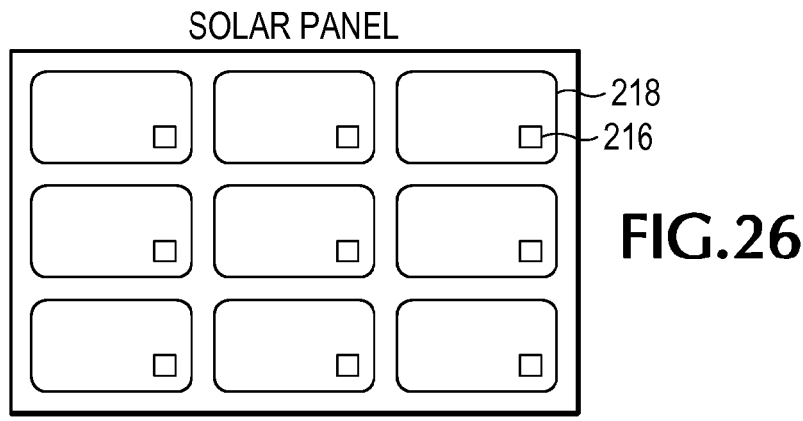
FIGS. 26-29 illustrate embodiments of integrated power converter arrangements according to the inventive principles of this patent disclosure.

At the cell level, as shown in FIG. 26, there may be one or more integrated power converters 216 per cell 218.

Figure 27:
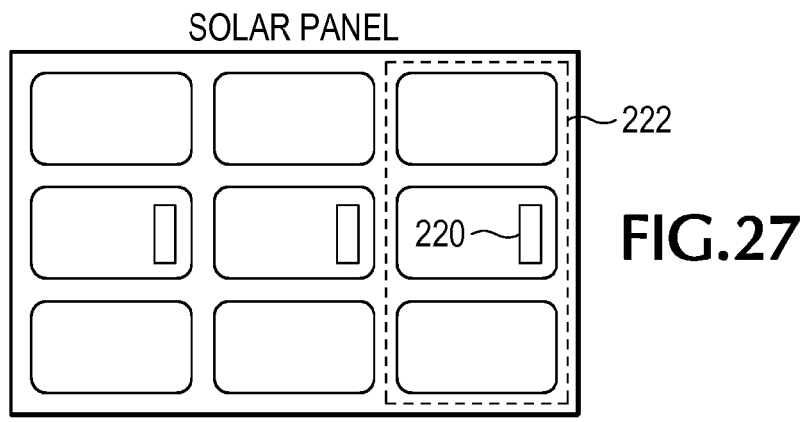

At the multi-cell level, as shown in FIG. 27, there may be one or more integrated power converters 220 for each subset 222 of cells. The number of cells for each subset maybe two or more, however, there may be additional benefits where the number of cells per subset is a multiple of 2, 4, 6, 8, 9 or 12.

Figure 28:
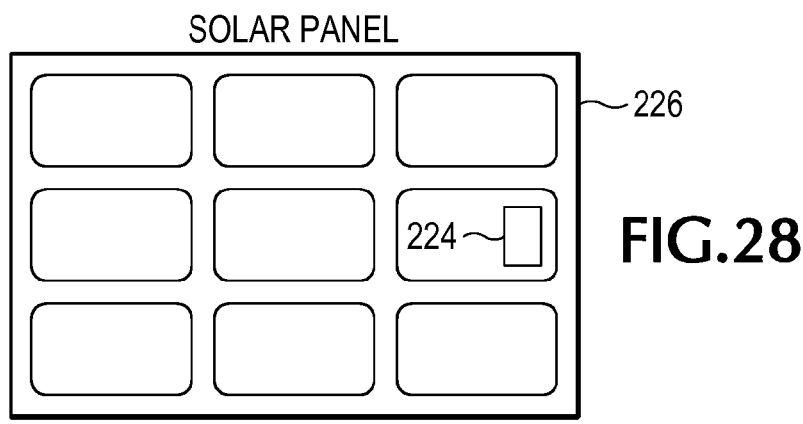
Figure 29:
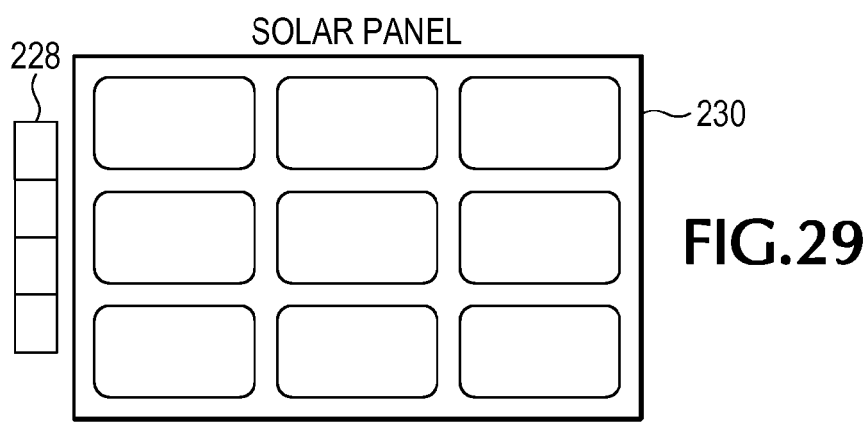

At the panel level, there may be one integrated power converter 224 at each panel 226 as shown in FIG. 28. Alternatively, there may be multiple integrated power converters 228 at each panel 230 as shown in FIG. 29.

At the multi-panel level, there may be one or more integrated power converters for each subset of panel. The number of panels in the subset may be two or more. At the module level, there may be one or more integrated power converters for every module. At the multi-module level, there may be one or more integrated power converters for each subset of module. The number of modules in a subset may be two or more. At the grid level, the number of integrated power converters may be one or more for every grid.

At the multi-cell, panel, multi-panel, module, multi-module, and grid level, the integrated power converters may be placed so that they may, for example, reduce the amount of AC wiring. There may be one or more integrated power converters for every single panel. The integrated power converters may be located close together, for example, for ease of integration or they may be located further apart, for example, each at a particular solar cell.

In any embodiment, multiple inverters may be located in a single housing, in multiple housings, in no housing, etc. In some embodiments, a housing may be a separate component, while in other embodiments, a housing may be part of some other system component. For example, in the embodiment of FIG. 29, the multiple integrated power converters 228 may be located in a common housing attached directly to the panel 230, or located separately from the panel, e.g., on a rack that holds the panel. Alternatively, the integrated power converters may be located in separate housings, or smaller groups of the integrated power converters may be located in multiple housings, either mounted directly to the panel, and/or separately from the panel, etc. In yet other embodiments, or more of the integrated power converters may be housed in some other system component such as an encapsulant on a panel.

Figure 30:
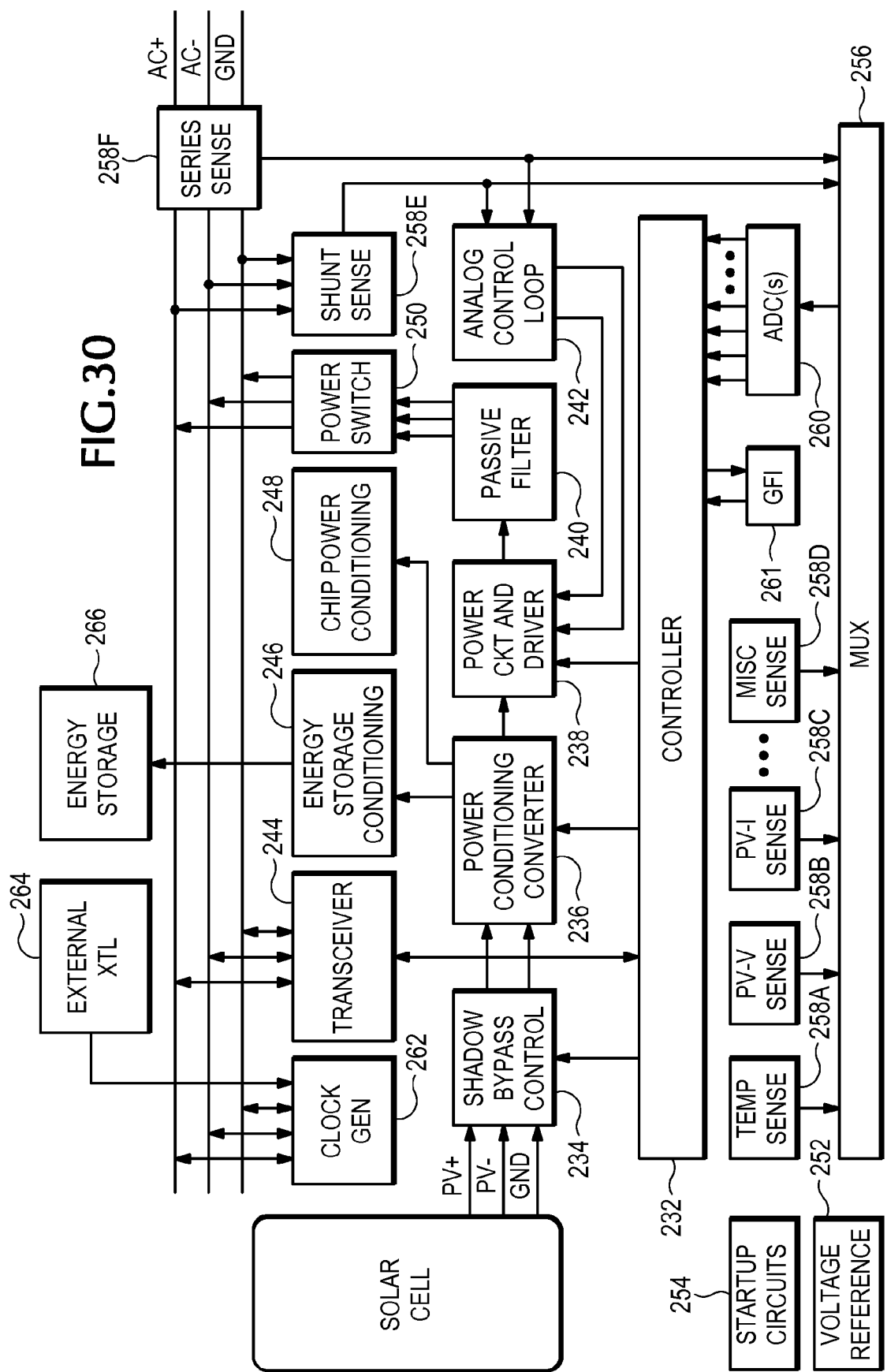
FIG. 30 illustrates an embodiment of an integrated power converter according to the inventive principles of this patent disclosure.

FIG. 30 illustrates an embodiment of an integrated power converter according to the inventive principles of this patent disclosure. Though shown in the context of a photovoltaic system, the embodiment of FIG. 30 may be utilized with any other type of DC power source.

The system of FIG. 30 may include some or all of the following components: a controller 232, shadow bypass control 234, power conditioning converter 236, power circuitry and driver 238, passive filter 240, analog control loop 242, transceiver circuit 244, energy storage conditioning 246, power conditioning 248, power switches 250, voltage reference circuit 252, startup circuit 254, multiplexers 256, sensing circuitry 258, ADC 260, clock generation circuit 262, external crystal oscillator 264, and/or energy storage device 266.

The controller 232 may include any type of logic including a digital signal processor (DSP), microcontroller, etc., and may be designed and/or optimized, for example, for low power operation and/or for high speed operation. The controller may implement any or all of the following functionality: maximum power point tracking, active filtering, HD control, power factor control, waveform generation, optimization, switch control, configuration management, shutdown control, startup control, and/or shadow bypass control.

The DSP core may include internal analog/digital converters to convert analog signal of any forms to digital signals. The DSP core may be in the form of application specific integrated circuit (ASIC) and/or field programmable gate arrays depending, for example, on the specific application the inverter system is intended for. Digital signal processing may be included to process digital signals, for example, in the time domain, and/or frequency domain, and/or spatial domain, and/or wavelet domain and/or autocorrelation domain. The digital signals to the DSP may be sampled with Nyquist sampling, oversampling or any other sampling methods, or any combination thereof. The DSP may be designed to include digital filtering, for example, finite impulse response (FIR) filters and/or infinite impulse response (IIR) filters.

The DSP core may be designed to implement maximum power point tracking (MPPT) for the inverter to, for example, assure the inverter is operating at and/or close to the maximum power. Pulse width modulation (PWM) of signals may be implemented with the DSP core to, for example, implement the control circuitry for a DC-DC power converter. The DSP may be programmed to act as an active filter for reducing harmonic distortion, for example, in the power converter from DC-AC. The DSP may be programmed to control switching of circuitry within the inverter system, for example, the DC-AC power conversion circuit. The DSP may also be programmed to add intelligence to the power control circuit, for example, to find the maximum power point and/or bypassing of damaged or inefficient DC power sources as part of the inverter system.

Additional functionality provided by the controller may include HD control, PF control, waveform generation, optimization, configuration management, shutdowns, etc.

Shadow bypass control 234 may be designed to control the power that flows through the solar energy inverter circuits, for example, when power is available from the photovoltaic cells that the block is connected to. The shadow bypass control circuitry may also be designed so that one or more or all photovoltaic cells connect to it may be disabled, for example, when the light illumination on the photovoltaic cell or cells is low. The shadow bypass control circuitry may be design for the bypassing of damaged or inefficient photovoltaic cells as part of a solar energy inverter system. The shadow bypass control block may be designed such that the power conversion efficiency of the inverter may be maximized.

Maximum power point tracking (MPPT) may be designed as part of the shadow bypass control to, for example, assure the inverter is operating at maximum power. The shadow bypass control may also be designed to control power in the inverter in response to changes in the environment, for example, variations in temperature, and/or pressure, and/or humidity, and/or light illumination, and/or availability of input DC power. The shadow bypass control circuitry may be designed to account for other factors, for example, variations in the integration process whether inter-process or intra-process and/or voltage supply.

Power conditioning converter 236 may be designed to convert a DC voltage to one or more DC voltages preferably at high power conversion efficiency. The power conditioning converter may be designed to step-up (i.e. boost) the input DC voltage to a higher output DC voltage and/or the power converter may be designed to step-down (i.e. buck) the input DC voltage to a lower output DC voltage depending on, for example, the specific application the inverter system is intended for. The power conditioning converter circuit may also be design to operate for both step-up and step-down (i.e. buck-boost/boost-buck) and/or designed to generate multiple output DC voltages from a single input (e.g., as in a fly-back converter). The input DC voltages and output DC voltages to the power converter may be a positive or negative signals. The output DC voltages may be of the same or different polarities relative to the input DC voltages depending, for example, on the specific application that the inverter system is intended for. The DC power conditioning converter circuit may be in the form of a linear and/or switching regulator. Pulse width modulated signals may be used to control one or more output voltages of the DC power conversion, for example, in switching voltage regulators.

Power circuitry and driver 238 may be designed to convert one or more DC voltages to one or more AC voltages, preferably at high power conversion efficiency. The power driver circuit may be designed to generate an AC signal, preferably for example, at high power conversion efficiency and/or at low total harmonic distortion (THD). Passive or active filters may be designed within the power driver circuit, for example, to reduce harmonic distortion in the DC-AC power conversion. Power switches may also be implemented within the power driver circuit, for example, to drive high power AC devices and/or to withstand high output voltages.

Filter(s) 240 may be designed to be active or passive. The filter may be designed to reduce the total harmonic distortion (THD) in the inverter system. The filter may be low pass, high pass, band pass or band reject depending, for example, on the intended purpose of the filter. The filter may be designed with only passive elements, for example, resistors and/or capacitors and/or inductors, or the filter may include active components, for example, operational amplifiers.

Analog control loop 242 may be designed to control the power circuit and driver circuitry. It may be designed to provide analog control of the power converter and/or driver circuitry, preferably to improve power conversion efficiency of the inverter system. The analog control loop may be design as a feed back loop to the DC-DC power converter and/or DC-AC driver circuitry, for example, to dynamically control and maximize the power conversion efficiency of these circuit blocks. Alternatively, the control loop may be implemented in digital or mixed-signal form separate from, or integral with, the controller 232.

Transceiver circuit 244 may be designed to, for example, communicate with the monitoring unit via the power line. The transceiver may be designed to, for example, operate at high frequency and low power. The transceiver may be design to communicate through circuitry outside of the inverter for example, through the power line and/or wireless links. The transceiver may include a line interface circuit to, for example interface the power grid to the transceiver. The transceiver may include one or more low noise amplifiers (LNA) to, for example, amplify the receive signal with low noise figure and/or high gain. The transceiver may include automatic gain control (AGC), for example, to automatically control the gain of the receiver. The transceiver may include driver circuits, for example, to drive the transmitted signals at high gain and/or efficiency. The transceiver may include a buffer circuit, for example, to amplify the signal to the driver circuitry. The transceiver may include on or more filters, for example, to filter unwanted frequency contents, i.e. high frequency noise. The transceiver may include its own ADC and DAC, for example, to convert analog signals to digital signals and vice versa.

Energy storage conditioning 246 may be designed to enable the system to store energy in the energy storage device.

Power conditioning 248 may include functionality which controls, monitors and/or analyzes (i) the power conversion operation of the inverter system and/or components thereof (for example, the DC-DC and/or DC-AC power conversion circuitry) (ii) the operating characteristics of the inverter and/or components thereof, (iii) the characteristics of the output power of the inverter system (for example, current, voltage and temporal characteristics thereof), (iv) the storage operation of one or more of the energy storage devices and/or energy supplied thereto (via, for example, the inverter system), and/or (v) the characteristics of the output power of one or more of the energy storage devices (for example, current, voltage and temporal characteristics thereof).

Power switch block 250 may include one or more power switches to transfer power from the solar cells to the power grid.

Voltage reference circuit 252 may be designed to control the voltage that is delivered to the power grid and/or the power condition circuit.

Startup circuit 254 may be designed to start up the integrated power converter as there is enough solar energy or other energy to power up the system.

Multiplexer 256 may be designed to choose between different digital or analog input sources. The multiplexer circuitry may be designed to select between the different sensing circuitry (for example) voltage and/or current sensing and/or any other digital and/or analog signal.

Sensing circuitry 258A-F may be designed to sense voltages and/or currents in the inverter system. The sensing circuit may be designed to sense one or more DC voltages and/or currents at, for example, the DC power source and/or at the output of the DC power converter. The sensing circuit may also be designed to sense one or more AC voltages and/or currents at, for example, the AC power source and/or at the output of the DC-AC power converter and/or power driver circuit.

Clock generation circuit 262 may be designed to generate one or more clocks for the integrated power converter, particularly for the transceiver circuit.

Crystal Oscillator 264 may include an internal or external crystal oscillator to generate the input clock to the clock generation circuitry.

Energy storage block 266 may include one or more energy storage devices which may be designed to store energy from the inverter system. It may be in the form of rechargeable or non-rechargeable battery, capacitor, other charge storage device and/or element, and/or inductor, or any combination thereof.

Analog/Digital converter (ADC) 260 may be designed to convert analog signals of any form to digital signals. The digital signals to the DSP may be sampled with Nyquist sampling, oversampling, or any other sampling methods, or any combination thereof.

A ground fault interruption (GFI) circuit may be included to provide protection by detecting and/or shutting down the system in response to ground fault conditions, communicating with a remote monitoring station, and/or taking other appropriate actions.

Figure 31:
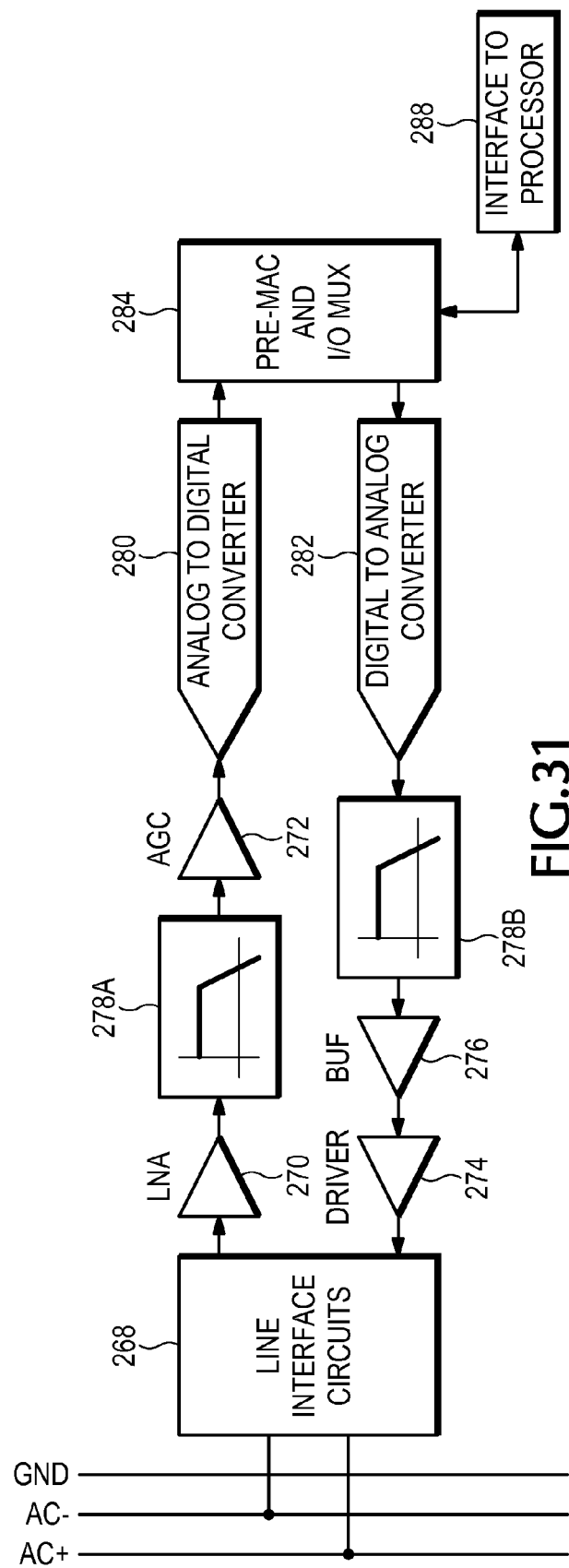
FIG. 31 illustrates an embodiment of a transceiver according to the inventive principles of this patent disclosure.

FIG. 31 illustrates an embodiment of a transceiver according to the inventive principles of this patent disclosure. The system of FIG. 31 may include some or all of the following: a line interface circuit 268, low noise amplifier 270, automatic gain control 272, driver circuit 274, buffer circuit 276, one or more filters 278, ADC 280, DAC 282, Pre-MAC 284, I/O MUX 286, and/or an interface circuit 288 for a processor.

Line interface circuit 268 may be designed to interface the power grid to the transceiver. Low noise amplifier (LNA) 270 may be designed to operate with, for example, low noise figure and/or high gain. Automatic gain control (AGC) 272 may be designed to automatically control the gain of the receiver. Driver circuit 274 may be designed to drive the transmitted signal to the power grid at, for example, high gain and/or efficiency. Buffer circuit 276 may be designed to pre-amplify the signal going to the driver circuitry. Filter(s) 278A and B may be designed to filter out unwanted frequency contents, for example, high frequency noise. Analog/digital converter 280 may be designed to operate at high, moderate, or low resolution at high, moderate or low speed. It may be designed, for example to dissipate low power. Digital/analog converter 282 may be designed to operate at high, moderate, or low resolution at high, moderate or low speed. It may be designed, for example to dissipate low power. Pre-MAC and I/O Mux 284 may choose between receive mode and/or transmit mode and/or idle mode. Interface circuit 288 may interface the transceiver to any and all types of processors. The interface may be serial or parallel or a combination of the two.

Figure 32:
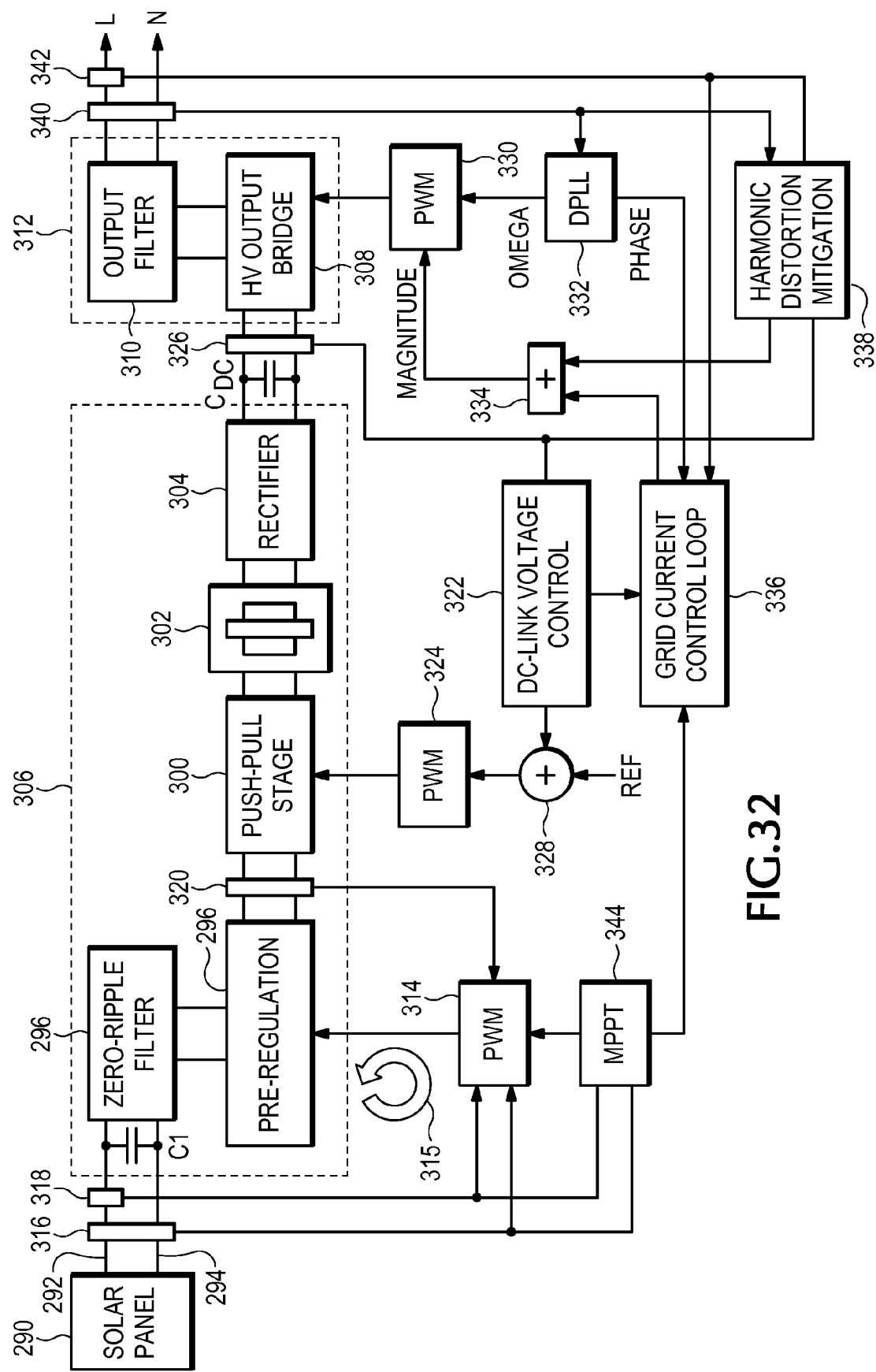
FIG. 32 illustrates an embodiment of an inverter system according to the inventive principles of this patent disclosure.

FIG. 32 illustrates an embodiment of an inverter system according to the inventive principles of this patent disclosure. DC power is applied to the system at terminals 292 and 294. The embodiment of FIG. 32 is shown in the context of a solar panel 290, but it may be utilized with other DC power sources such as fuel cells, batteries, capacitors, etc. In this example, the main power path continues through a collection of components that form a DC-DC converter 306. The DC-DC converter transforms the DC power from relatively low voltage and high current, which is characteristic of PV panels having crystalline cells and some other DC power sources, to relatively higher voltage and lower current suitable for conversion to AC power in a form that can be easily distributed to a local user and/or transmitted to remote users through a power grid, etc. In other embodiments, for example, systems based on thin-film PV cells, the DC power may be generated at higher voltages, thereby eliminating or reducing the need or usefulness of voltage boosting, pre-regulation, etc. In this embodiment, the DC-DC converter is shown with two stages: a boost-type pre-regulator and a push-pull type main stage. In other embodiments, however, the DC-DC converter may be implemented with any suitable arrangement of single or multiple stages.

Referring again to FIG. 32, a zero-ripple input filter 296, for example a passive filter, may be utilized to reduce high frequency (HF) ripple for improved efficiency. Depending on the implementation, the benefit of the zero ripple filter may not be worth the additional cost.

Pre-regulator 298 may enable the system to operate from a wider range of input voltages to accommodate PV panels from different manufacturers. The pre-regulator may also facilitate the implementation of an advanced control loop to reduce input ripple as discussed below. The pre-regulator may be implemented, for example, as a high-frequency (HF) boost stage with soft switching for high efficiency and compact size. In this example, the pre-regulator provides a modest amount of initial voltage boost to feed the next stage. However, other pre-regulator stages such as buck converters, buck-boost converters, push-pull converters, etc., may be used as a pre-regulator stage.

Push-pull stage 300 provides the majority of the voltage boost in conjunction with a transformer 302 and rectifier 304. The use of a push-pull stage may facilitate the implementation of the entire system with a single integrated circuit since the drivers for both power switches may be referenced to the same common voltage. The output from the rectifier stage 304 is applied to a DC link capacitor $C_{DC}$ which provides a high voltage DC bus to feed the DC-AC inverter stage 312.

The inverter stage 312 includes a high voltage output bridge 308 which, in this embodiment, is implemented as a simple H-bridge to provide single-phase AC power, but multi-phase embodiments may also be implemented. A passive output filter 310 smoothes the waveform of the AC output before it is applied to a load or grid at the neutral and line output terminals L and N.

A first (input) PWM controller 314 controls the pre-regulator 296 in response to various sense inputs. In the embodiment of FIG. 32, voltage sensors 316 and 320 and current sensor 318 provide a measure of the overall input voltage and current and the output voltage of the pre-regulator, respectively. However, the first PWM controller may operate in response to fewer or more sense inputs. For example, any of these sense inputs may be omitted and/or other sense inputs may be included, e.g., the voltage on DC link capacitor $C_{DC}$, or currents measured at any other points along the power path.

In one embodiment, the first PWM controller 314 implements an inner control loop (shown conceptually by arrow 315) by controlling the pre-regulator 296 to maintain a constant voltage at the input terminals 292 and 294. This may reduce or eliminate input ripple, thereby reducing the size of capacitor C1 and eliminating the zero ripple filter. In essence, the inner control loop may transfer the energy storage function from the input capacitor C1 to the DC link capacitor $C_{DC}$. This energy storage is used for cycle-by-cycle power balance at the AC output frequency. That is, power is preferably drawn from the DC source at a constant rate, whereas the instantaneous AC power output fluctuates between zero and some maximum value at twice the AC line frequency.

To prevent these AC power fluctuations from being reflected back to the DC power source, a decoupling capacitor is used to store energy during troughs (or "valleys") in the AC line cycle, and release energy during peaks in the AC line cycle. This is typically accomplished through the use of a large electrolytic capacitor for C1. The inner control loop, however, moves this energy storage to the DC link capacitor $C_{DC}$ where energy is stored and discharged in the form of large voltage fluctuations on the capacitor. This is in contrast to conventional systems in which the DC link voltage is regulated to a constant value.

Regulating a constant DC input voltage may provide several advantages. First, reducing ripple in the input waveform improves the efficiency of some DC power sources such as PV panels which suffer from resistive losses related to the ripple. Second, moving the energy storage to the DC link capacitor may eliminate the need for an input electrolytic capacitor which is an expensive, bulky and unreliable component with a short lifespan. Instead, the energy may be stored in a higher voltage form on the DC link capacitor which is less expensive, more reliable, has a longer lifespan and may take up less space. Moreover, the size of the DC link capacitor itself may also be reduced.

A maximum power point tracking (MPPT) circuit 344 forms an outer control loop to maintain the average input voltage and current, sensed by voltage and current sensors 316 and 318, respectively, at the optimum points to maximize the output power available from the DC power source, which in this example, is a PV panel.

A second (push-pull) PWM controller 324 controls the push-pull stage in response to the DC link voltage sensed by voltage sensor 326. A DC-link voltage controller 322 provides a feedback signal which is compared to a reference signal REF and applied to the second PWM controller 324. The DC-link voltage controller 322 may operate in different modes. In one mode, it may simply convey the instantaneous DC-link voltage to the PWM circuit, thereby causing the DC-link voltage to be regulated to a constant value. However, if used in conjunction with the input ripple reduction loop discussed above, the DC-link voltage controller 322 may filter out the AC ripple so that the second PWM loop only regulates the long-term DC value (e.g., the RMS value) of the DC-link voltage. That is, the AC ripple on the DC-link capacitor rides on a DC pedestal that slides up or down in response to the DC-link voltage controller. This may be useful, for example, to control distortion in the AC output power as discussed below.

A third (output) PWM controller 330 controls the four switches in the H-bridge 308 to provide a sinusoidal AC output waveform. A non-DQ, non-cordic polar form digital phase locked loop (DPLL) 332 helps synchronize the output PWM to the AC power line. The overall AC output is monitored and controlled by a grid current control loop 336 which adjusts the third PWM controller 330 in response to outputs from the MPPT circuit, the DC-link voltage controller, the DPLL, and the output voltage and/or current. A harmonic distortion mitigation circuit 338 further adjusts the output PWM through a summing circuit 334 to eliminate or reduce distortion in response to the output voltage and current waveforms sensed by voltage and current sensors 340 and 342, respectively.

An output signal from the harmonic distortion mitigation circuit 338 may also be applied to the DC-link voltage controller for optimization of the DC-link voltage. In general, it may be preferable to minimize the DC-link voltage to increase overall efficiency. However, if the troughs of the voltage excursions on the DC-link capacitor fall too low, it may cause excessive distortion in the AC output. Thus, the DC-link voltage controller may slide the DC pedestal on the DC-link capacitor up or down to maintain the bottoms of the AC troughs at the lowest point possible while still holding distortion to an acceptable level as indicated by the harmonic distortion mitigation circuit.

Figure 33:
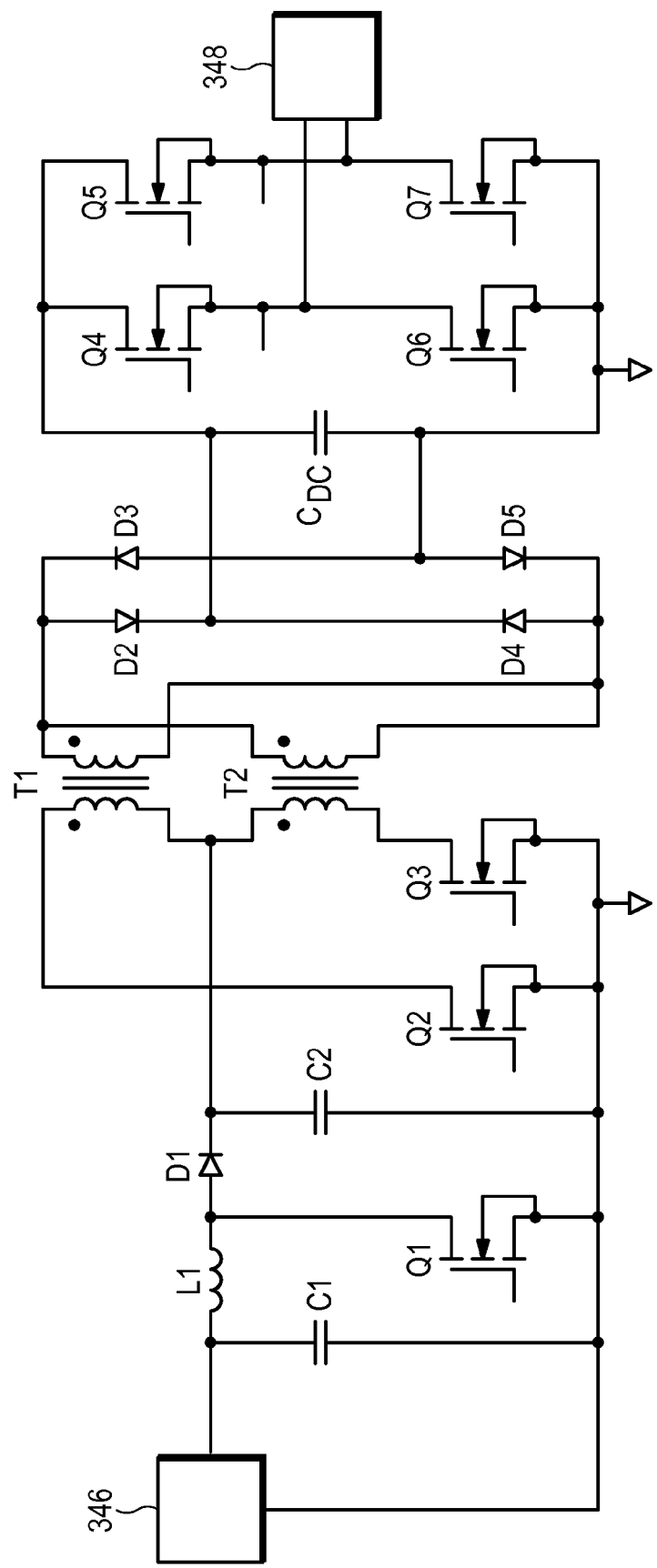
FIG. 33 is a schematic diagram of an embodiment of a main power path suitable for implementing the inverter system of FIG. 32 according to the inventive principles of this patent disclosure.

FIG. 33 is a schematic diagram of an embodiment of a main power path suitable for implementing the inverter system of FIG. 32 according to the inventive principles of this patent disclosure. Power from DC power source 346 is applied to the system at capacitor C1 which may be a large energy storage capacitor, or if the input ripple reduction control loop is used, a smaller filter capacitor to prevent HF switching transients from being fed back into the DC power source. Inductor L1, transistor Q1 and diode D1 form the pre-regulation boost converter which is controlled by the input PWM controller.

The output from the boost converter appears across capacitor C2 which may provide HF filtering and/or energy storage depending on the implementation. The push-pull stage includes transistors Q2 and Q3 which alternately drive a split-core transformer T1,T2 in response to the push-pull PWM controller. The transformer has an appropriate turns ratio to generate a high-voltage DC bus across the DC-link capacitor $C_{DC}$ to adequately feed the output bridge. Depending on the implementation, the transformer may also provide galvanic isolation between the input and output of the inverter system. The rectifier may include passive diodes D2-D5 as shown in FIG. 33, active synchronous rectifiers, or any other suitable arrangement.

Transistors Q4-Q7 in the HV output bridge are controlled by the output PWM controller to generate the AC output which is filtered by grid filter 348 before being applied to the load or power grid.

An advantage of the embodiment of FIG. 33 is that it is readily adaptable to fabrication as an integrated power converter, for example, with a single integrated circuit (IC). Since most of the power switches are referenced to a common power supply connection, isolated drivers are not required for these switches. In a monolithic implementation of the entire structure, there may be dielectric isolation between the high-side switches in the output H-bridge and their corresponding low-side switches. There may also be isolation between different sections of the system. For example, sense circuitry located in one section may transfer information to processing circuitry in another section that performs control and/or communication and/or other functions in response to the information received from the first section. Depending on the particular application and power handling requirements, all of the components including the power electronics, passive components, and control circuitry (intelligence) may be fabricated directly on the IC chip. In other embodiments, it may be preferable to have the largest passive components such as inductors, transformers and capacitors located off-chip. In yet other embodiments, the system of FIG. 33 may be implemented as a multi-chip solution.

Figure 34:
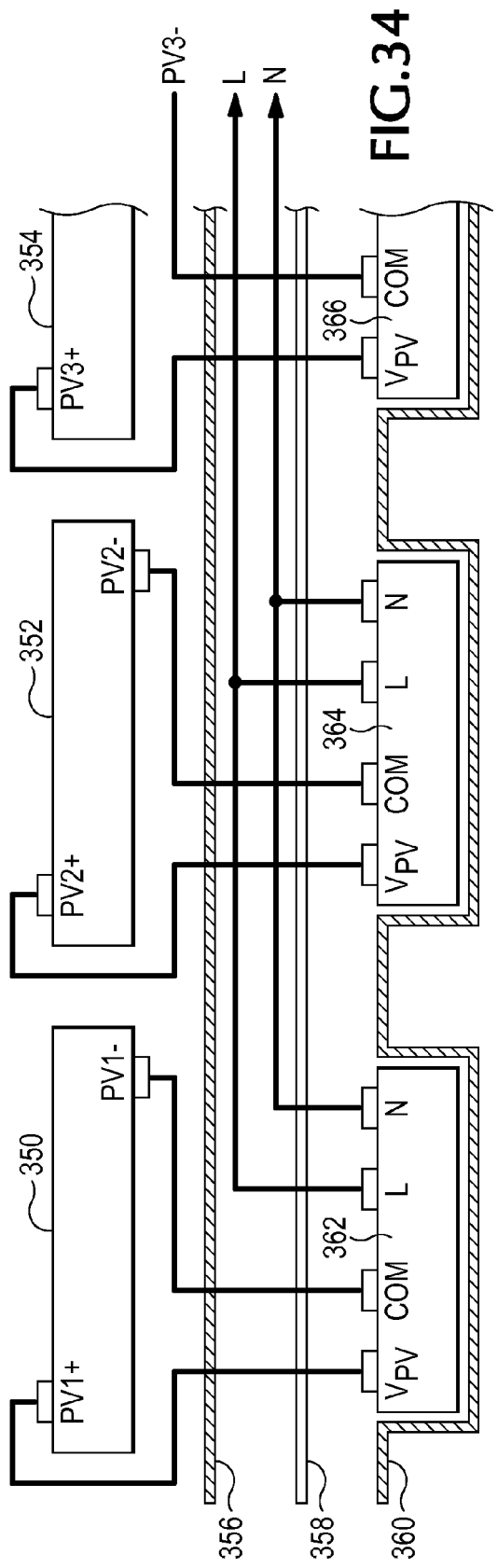
FIG. 34 illustrates an embodiment of a PV panel according to the inventive principles of this patent disclosure.

FIG. 34 illustrates an embodiment of a PV panel according to the inventive principles of this patent disclosure. The panel includes PV cells 350, 352, 354, etc., arranged above a first isolation layer or stratum 356. Each PV cell is coupled to a corresponding one of inverters 362, 364, 366, etc., which are fabricated as single integrated power converters. In this embodiment, contacts (e.g., bond pads) for the DC inputs $V_{PV}$ and COM and AC outputs L and N on each inverter chip are arranged on the same side of the inverter. The AC outputs from the multiple inverters are coupled together to form an AC distribution (or collection) bus between the first isolation layer 356 and a second isolation layer 358. AC outputs may be single phase and/or multi-phase. An encapsulation layer 360 may be formed over the inverters to provide protection from environmental elements and/or additional structural integrity.

Figure 35:
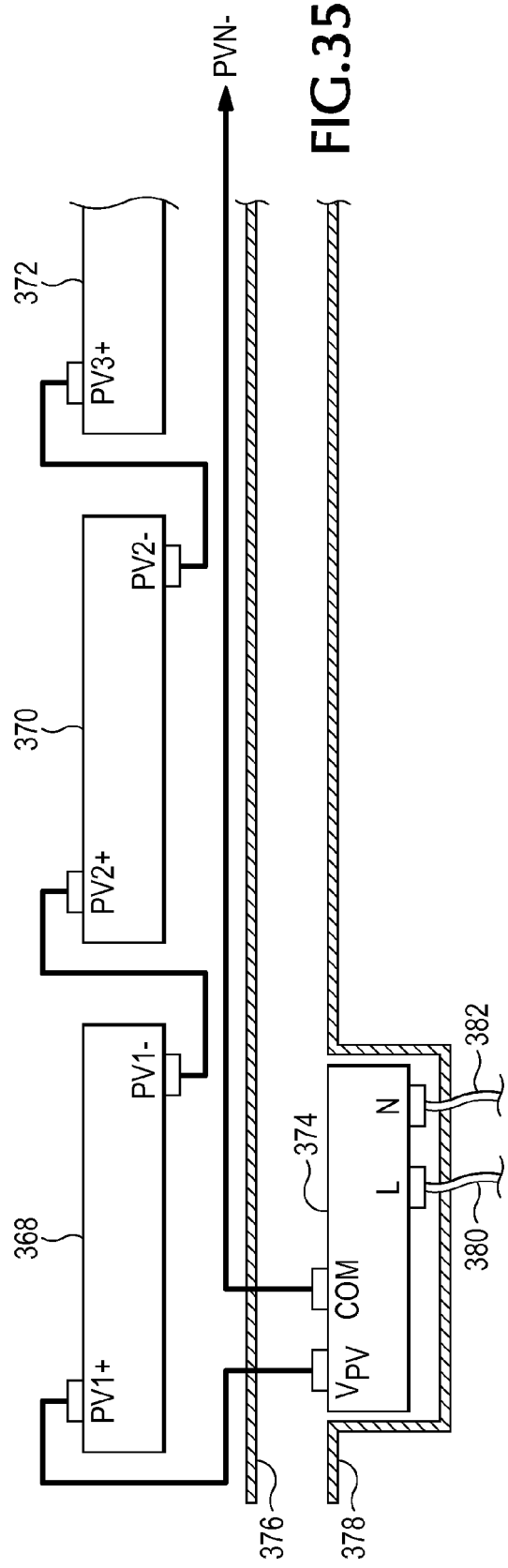
FIG. 35 illustrates another embodiment of a PV panel according to the inventive principles of this patent disclosure.

FIG. 35 illustrates another embodiment of a PV panel according to the inventive principles of this patent disclosure. In the embodiment of FIG. 35, each inverter 374 is connected to a string of PV cells 368, 370, 372, etc., rather than individual cells. In this embodiment, only one isolation layer 376 separates the PV cells from the inverter or inverters. The terminals for the AC outputs L and N are arranged on the opposite side of the integrated power converter from the DC inputs $V_{PV}$ and COM. The AC outputs are provided on wire leads 380 and 382 which may be combined with the outputs of other inverters on the panel, if any, and/or wired directly to a load or power distribution grid. AC outputs may be single phase and/or multi-phase. An encapsulation layer 378 may be formed over the inverters to provide protection from environmental elements and/or additional structural integrity.

In the embodiments of FIGS. 34 and 35, an additional ground line may be added to the AC distribution bus depending on the implementation or application. The panels of FIGS. 34 and 35 may further include a glass superstrate located above the PV cells to provide a rigid structure for the entire panel. Alternatively, one or both of the isolation layers may provide the structural basis for the panel, either rigid or flexible.

FIGS. 34 and 35 provide quasi-exploded cross-sectionals views that are not to scale or proportion for purposes of illustrating the general arrangement of components. Spaces shown in the illustrations may not actually be implemented and/or may be filled with encapsulants, insulators, adhesives, etc. The embodiments shown in FIGS. 34 and 35 illustrate some possible implementation details of the panels shown in FIGS. 26-29, but neither the panels of FIGS. 26-29, nor the embodiments shown in FIGS. 34 and 35 are limited to these details.

The inventive principles of this patent disclosure have been described above with reference to some specific example embodiments, but these embodiments can be modified in arrangement and detail without departing from the inventive concepts. Such changes and modifications are considered to fall within the scope of the following claims.

For example, some of the embodiments described above have been illustrated in the context of PV solar power systems. However, the inventive principles also apply to systems for other types of DC power sources. Thus, one embodiment of an energy conversion system according to the inventive principles includes one or more DC power sources and two or more inverters to convert DC power from the power sources to AC power. In some embodiments, the AC power from the two or more inverters may be combined to provide a single AC output. For example, the one or more DC power cells may include one or more fuel cells, one or more photovoltaic cells, one or more capacitors, e.g., large electrolytic capacitors, or any combination thereof. In such a system, each of the inverters may be coupled for example to a single one of the DC power cells, or each of the inverters is coupled to a single string of the DC power cells, etc. The system may be arranged so that the components are part of a single compact assembly, or physically distributed.

The invention claimed is:

1. A solar photovoltaic module comprising:
    a plurality of photovoltaic cells to generate DC power in response to exposure to an amount of sunlight;
    a plurality of integrated direct current-to-alternating current (DC-to-AC) inverters, wherein each integrated DC-to-AC inverter comprises (i) a DC input electrically coupled to a single, different photovoltaic cell of the plurality of photovoltaic cells and (ii) an AC output electrically coupled to a corresponding AC output of each other integrated DC-to-AC inverter; and
    a first isolation layer, different from the integrated DC-to-AC inverters and the photovoltaic cells, separating each photovoltaic cell from each integrated DC-to-AC inverter.

2. The solar photovoltaic module of claim 1, wherein the DC input of each integrated DC-to-AC inverter is electrically connected to the corresponding single photovoltaic cell via corresponding electrical interconnections that pass through the first isolation layer.

3. The solar photovoltaic module of claim 2, further comprising a second isolation layer, different from the integrated DC-to-AC inverters and the photovoltaic cells, located between the first isolation layer and each integrated DC-to-AC inverter.

4. The solar photovoltaic module of claim 3, further comprising an AC bus connected to the AC output of each integrated DC-to-AC inverter, wherein the AC bus is located between the first isolation layer and the second isolation layer.

5. The solar photovoltaic module of claim 1, wherein the DC input and the AC output of each integrated DC-to-AC inverter is defined on a first side of the corresponding integrated DC-to-AC inverter that faces toward the corresponding single photovoltaic cell.

6. The solar photovoltaic module of claim 1, wherein each of the integrated DC-to-AC inverters comprises an integrated power converter, wherein each integrated power converter comprises a plurality of electrical components established on a single integrated circuit.

7. The solar photovoltaic module of claim 1, wherein each of the integrated DC-to-AC inverters comprises an integrated power converter, wherein each integrated power converter comprises a plurality of active electrical components established on a single integrated circuit and a plurality of passive components located apart from the single integrated circuit.

8. The solar photovoltaic module of claim 7, wherein the plurality of active electrical components comprise at least one power transistor and the plurality of passive components comprise at least one capacitor.

9. The solar photovoltaic module of claim 1, further comprising an encapsulation layer having a plurality of pockets defined in an inner side, wherein each of the integrated DC-to-AC inverters is positioned in a corresponding pocket of the encapsulation layer.

10. The solar photovoltaic module of claim 9, further comprising:
a second isolation layer, different from the integrated DC-to-AC inverters and the photovoltaic cells, located between the first isolation layer and the encapsulation layer; and
an AC bus (i) connected to the AC output of each integrated DC-to-AC inverter and (ii) located between the first isolation layer and the second isolation layer.

11. A solar photovoltaic module comprising:
a plurality of strings of photovoltaic cells, wherein each string of photovoltaic cells comprises multiple individual photovoltaic cells electrically coupled together to generate a DC power in response to exposure to an amount of sunlight;
a plurality of integrated direct current-to-alternating current (DC-to-AC) inverters, wherein each integrated DC-to-AC inverter comprises (i) a DC input electrically coupled to a single, different string of photovoltaic cells and (ii) an AC output electrically coupled to a corresponding AC output of each other integrated DC-to-AC inverter; and
an isolation layer, different from the integrated DC-to-AC inverters and the photovoltaic cells, separating each photovoltaic cell from each integrated DC-to-AC inverter.

12. The solar photovoltaic module of claim 11, wherein the DC input of each integrated DC-to-AC inverter is electrically connected to the corresponding single string of photovoltaic cells via corresponding electrical interconnections that pass through the isolation layer.

13. The solar photovoltaic module of claim 11, wherein the DC input of each integrated DC-to-AC inverter is defined on a first side of the corresponding integrated DC-to-AC inverter that faces toward the corresponding single string of photovoltaic cells and the AC output of each integrated DC-to-AC inverter is defined on a second side of the corresponding integrated DC-to-AC inverter opposite the first side.

14. The solar photovoltaic module of claim 11, wherein each of the integrated DC-to-AC inverters comprises an integrated power converter, wherein each integrated power converter comprises a plurality of electrical components established on a single integrated circuit.

15. The solar photovoltaic module of claim 11, wherein each of the integrated DC-to-AC inverters comprises an integrated power converter, wherein each integrated power converter comprises a plurality of active electrical components established on a single integrated circuit and a plurality of passive components located apart from the single integrated circuit.

16. The solar photovoltaic module of claim 15, wherein the plurality of active electrical components comprise at least one power transistor and the plurality of passive components comprise at least one capacitor.

17. The solar photovoltaic module of claim 11, further comprising an encapsulation layer having a plurality of pockets defined in an inner side, wherein each of the integrated DC-to-AC inverters is positioned in a corresponding pocket of the encapsulation layer.

* * * * *